(12) United States Patent
Bostan et al.

(10) Patent No.: US 11,913,523 B2
(45) Date of Patent: Feb. 27, 2024

(54) PRECESSIONAL GEAR TRANSMISSION

(71) Applicants: Viorel Bostan, Chisinau (MD); Ion Bostan, Chisinau (MD); Maxim Vaculenco, Chisinau (MD)

(72) Inventors: Viorel Bostan, Chisinau (MD); Ion Bostan, Chisinau (MD); Maxim Vaculenco, Chisinau (MD)

(*) Notice: Subject to any disclaimer, the term of this patent is extended or adjusted under 35 U.S.C. 154(b) by 0 days.

(21) Appl. No.: 17/777,997

(22) PCT Filed: Nov. 19, 2020

(86) PCT No.: PCT/MD2020/000004
§ 371 (c)(1),
(2) Date: May 18, 2022

(87) PCT Pub. No.: WO2021/137682
PCT Pub. Date: Jul. 8, 2021

(65) Prior Publication Data
US 2022/0412437 A1   Dec. 29, 2022

(30) Foreign Application Priority Data
Dec. 31, 2019 (MD) .................. md a 2019 0101

(51) Int. Cl.
*F16H 1/32* (2006.01)
*F16H 1/34* (2006.01)
*F16H 55/08* (2006.01)

(52) U.S. Cl.
CPC ............... *F16H 1/321* (2013.01); *F16H 1/34* (2013.01); *F16H 55/08* (2013.01)

(58) Field of Classification Search
CPC ............. F16H 1/321; F16H 1/34; F16H 55/08
See application file for complete search history.

(56) References Cited

U.S. PATENT DOCUMENTS

| 3,935,750 A | 2/1976 | Maroth |
| 5,655,985 A | 8/1997 | Herstek |

(Continued)

FOREIGN PATENT DOCUMENTS

| CN | 201412479 Y | 2/2010 |
| CN | 201672005 U | 12/2010 |

(Continued)

OTHER PUBLICATIONS

Machine-generated English language translation of claims of JP S54120347 A (Sep. 18, 1979).

(Continued)

*Primary Examiner* — Sherry L Estremsky
(74) *Attorney, Agent, or Firm* — Hershkovitz & Associates, PLLC; Abe Hershkovotiz

(57) ABSTRACT

The precessional gear transmission comprises a body, a satellite wheel with two bevel gear rings driven by a crankshaft in sphero-spatial motion around a fixed point, two central bevel wheels, one immobile fixed in the body and the other mobile mounted on a driven shaft. The teeth of the gear rings have a circular arc flank profile, those of the central bevel wheels are variable curvilinear. The configuration of the parameters of angles, the number of teeth, the ratio of the numbers of teeth of the mating wheels in the gears and the radius of the circular arc of the teeth profile of the gear rings determines the geometry and the kinematics of the contact of the teeth, the degree of frontal overlap, expressed by the number of simultaneously engaged pairs of teeth and defines the pressure angle between the mating flanks.

13 Claims, 17 Drawing Sheets

(56) References Cited

U.S. PATENT DOCUMENTS

| | | | | |
|---|---|---|---|---|
| 8,181,734 | B2 * | 5/2012 | Shiina | B62D 5/0409 |
| | | | | 180/443 |
| 8,381,867 | B2 * | 2/2013 | Shiina | F16H 35/008 |
| | | | | 180/444 |
| 10,281,008 | B2 * | 5/2019 | Saito | F16H 1/32 |
| 2006/0061049 | A1 | 3/2006 | Zhang | |

FOREIGN PATENT DOCUMENTS

| | | | |
|---|---|---|---|
| DE | 2445209 | A1 * | 4/1976 |
| JP | S54120347 | A | 9/1979 |
| JP | S6011749 | A | 1/1985 |
| MD | 471 | B1 | 9/1996 |
| MD | 495 | B1 | 10/1996 |
| MD | 2177 | B1 | 5/2003 |
| MD | 20010368 | A | 6/2004 |
| MD | 2729 | B1 | 3/2005 |
| MD | 4354 | B1 | 6/2015 |
| RO | 116120 | B1 | 10/2000 |
| RU | 2054592 | C1 | 2/1996 |
| SU | 1409804 | A1 | 7/1988 |
| SU | 1455094 | A1 | 1/1989 |
| SU | 1594329 | A1 | 9/1990 |
| SU | 1758322 | A1 | 8/1992 |

OTHER PUBLICATIONS

English language Abstract of JP S6011749 A (Jan. 22, 1985).
Machine-generated English language translation of Abstract of SU 1455094 A1 (Jan. 30, 1989).
Machine-generated English language translation of Abstract of SU 1758322 A1 (Aug. 30, 1992).
International Search Report in International Application No. PCT/MD2020/000004, dated Mar. 15, 2021.
Written Opinion of the International Searching Authority in International Application No. PCT/MD2020/000004, dated Mar. 15, 2021.
English language Abstract of CN 201672005 U (Dec. 15, 2010).
English language Abstract of CN 201412479 Y (Feb. 24, 2010).
English language Abstract of MD 471 B1 (Sep. 30, 1996).
English language Abstract of MD 495 B1 (Oct. 31, 1996).
English language Abstract of MD 2729 B1 (Mar. 31, 2005).
English language Abstract of MD 4354 B1 (Jun. 30, 2015).
English language Abstract of MD 2177 B1 (May 31, 2003).
English language Abstract of MD 20010368 A (Jun. 30, 2004).
English language Abstract of RO 116120 B1 (Oct. 30, 2000).
English language machine translation of Abstract of RU 2054592 C1 (Feb. 20, 1996).
Search Report in related Moldovan Application No. a 2019 0101, dated Sep. 29, 2021.

* cited by examiner $Z_1=29, Z_2=30, R=75mm, r=5mm, \theta=2.5°, \delta=30°, \beta=3.814°$ $Z_1 - Z_2$: $Z_2=31$, $Z_1=Z_2-1=30$, $\theta=3.5°$, $\delta=22.5°$, $\beta=3.5°$, $R=75$mm, $r=4.6$mm.
$Z_3 - Z_4$: $Z_3=25$, $Z_4=Z_3-1=24$, $\theta=3.5°$, $\delta=22.5°$, $\beta=4.8°$, $R=75$mm, $r=6.3$mm.

$Z_1 - Z_2$: $Z_2=24$, $Z_1=Z_2+1=25$, $\theta=3.5°$, $\delta=0°$, $\beta=4.8°$, $R=75$mm, $r=6.3$mm.
$Z_3 - Z_4$: $Z_3=31$, $Z_4=Z_3-1=30$, $\theta=3.5°$, $\delta=22.5°$, $\beta=3.5°$, $R=75$mm, $r=4.6$mm.

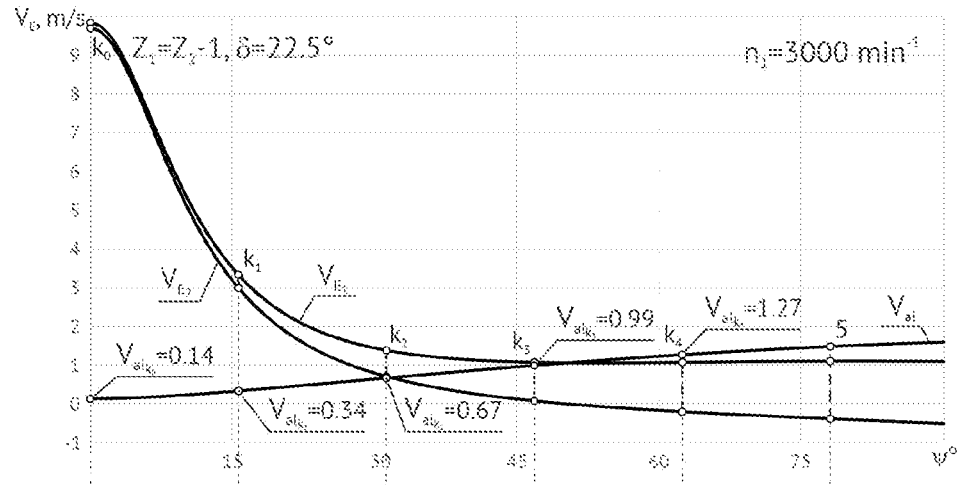
FIG. 14A
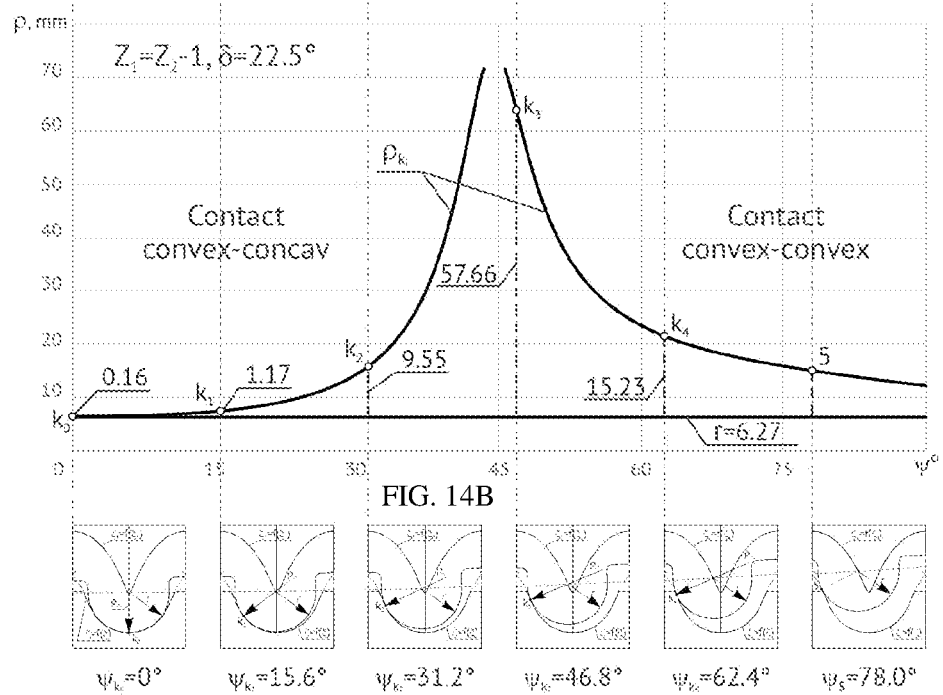
FIG. 14B
FIG. 14C

PRECESSIONAL GEAR TRANSMISSION

CROSS-REFERENCE TO RELATED APPLICATIONS

This application is a national stage of International Application No. PCT/MD2020/000004, filed Nov. 19, 2020, which claims the benefit of Republic of Moldova Application No. a 20190101, filed Dec. 31, 2019, in the State Agency on Intellectual Property (AGEPI).

BACKGROUND OF THE INVENTION

Technical Field

The present invention relates to mechanical engineering, namely, to precessional planetary transmissions.

Background Art

A precessional gear transmission is known wherein a satellite wheel has teeth with a rectilinear profile, and a central wheel with a circular arc profile with the radius origin placed on a normal raised from the contact point of mating teeth passing through an intersection point of a tooth evolute slope line with a circular arc profile with a rectilinear profile equidistance.

A disadvantage of the studied transmission is in the execution of the tooth profiles with approximation, which leads to a diminution of kinematic precision of the transmission and the mating of teeth with a presence of frictional sliding between a flanks of the mating teeth, which implies an increase of energetic losses in the gear and a decrease in mechanical efficiency.

A precessional gear transmission of conical bolts is also known, including a body, a crankshaft and a coaxially driven shaft, a satellite wheel with two bevel gear rings installed on an inclined portion of the crankshaft between two central bevel wheels, one immobile fixed in the body and the other mobile mounted on the driven shaft, wherein the satellite wheel rings are made of conical bolts, assembled with springs between them, which provide axial and radial flotation to gear rings, and, consequently, diminish the impact of the execution and mounting errors on the load distribution in the bolt gear.

An embodiment of the precessional transmission with bolt gear has disadvantages which limit the extension of its use by the following:

- The load-bearing capacity of the "conical bolt-tooth" contact is limited by the median radius of the conical bolts, which cannot exceed half of the teeth pitch, and the teeth contact in most bearing pairs is convex-convex and convex-rectilinear.
- The conical bolts require high precision of fabrication of their dimensions and of individual axial positioning thereof, upon which depends the uniformity of the load distribution between the simultaneously engaged pairs of teeth.
- The satellite rings made of conical bolts make it irrational, difficult and sometimes impossible to manufacture gears with diameters of ≤50 [mm].
- The production and assembly cost of the gear with bolts is relatively higher and requires high precision of execution and assembly.

The technical problems in creating a precessional gear transmission, produce an increase in the load-bearing capacity and mechanical efficiency, extension of kinematic and functional possibilities, as well as extension of the scope of transmission.

SUMMARY OF THE INVENTION

The present invention, according to a first embodiment, removes the aforesaid disadvantages by comprising a body, a crankshaft and a coaxially driven shaft, a satellite wheel with two bevel gear rings installed on an inclined portion of the crankshaft between two central bevel wheels, one immobile fixed in the body and the other mobile mounted on the driven shaft. The novelty here lies in that the teeth engage in contacts with convex-concave geometry, wherein the central bevel wheels are made with straight teeth and have curvilinear flank profiles with variable curvature with one tooth less than the satellite wheel rings made with circular arc flank profiles, the teeth flanks mate with frontal overlap $\varepsilon_f$ within the limits $1.5 \leq \varepsilon_f \leq 4.0$ simultaneously engaged pairs of teeth, at the same time the gearwheels are made with the conical axoid angle within the limits $0° \leq \delta \leq 30°$, with the angle between the axes of the crank and the central bevel wheels within the limits $1.5° \leq \theta \leq 7°$ and an angle at a center of precession of a radius of curvature of the profile of the teeth in the circular arc of the wheel bevel gear rings of the satellite wheel being within limits of $2° \leq \beta \leq 7°$ and the circular arc radius r of the flank profile of a Z-toothed satellite wheel gear ring is within the limits $1.0$ D/Z [mm] $\leq r \leq 1.57$D/Z [mm], where D is the mean diameter of the gear and Z is the number of teeth of the bevel gear ring, which generally provides a reduction of the difference in the curvatures $(\rho_{ki}-r)$ of the flank profiles in the section with diameter D within the limits $0.02$D/Z [mm]$\leq(\rho_{ki}-r)\leq 1.5$D/Z [mm], of the pressure angle $\alpha$ between the flanks of up to $15°$ as well as a decrease in the relative friction velocity between the mating flanks.

Second, the wheel teeth are made inclined, which provides an increase in the total length of the contact lines with their gradual entry into the gear field and an increase in the share of pure rolling of the engaged teeth flanks with sphero-spatial interaction.

Third, one of the satellite wheel bevel rings with the conical axoid angle $\delta=0°$ is made of bolts with one less or more than the number of central bevel wheel teeth with which it engages, which provides a pressure angle between the mating flanks $\alpha \leq 45°$ and the extension of kinematic possibilities.

Fourth, one of the satellite wheel rings with the conical axoid angle $\delta>0°$ is made of conical bolts with one less than the number of central bevel wheel teeth and with a profile angle $\alpha>45°$, which provides for the rolling of the conical bolts on the flank profile of the central wheel teeth with inclined slope effect and the operation of the transmission in a multiplier mode.

Fifth, the satellite wheel is installed on a spherical support placed on the driven shaft in its center of precession and coaxially with the mobile central bevel wheel, at the same time the satellite wheel is equipped with a semi-axle, at the end of which is mounted a bearing, kinematically coupled with the crankshaft.

The precessional gear transmission, according to a second embodiment, comprises a body, a coaxial crankshaft and driven shaft, a satellite wheel with two bevel gear rings, mobile and immobile central bevel wheels.

The transmission with precessional gear, according to the second embodiment, includes a housing, a crank shaft and a coaxial driven shaft, a satellite rate with two conical gear crowns, and movable and immobile center conical wheels.

The novelty here lies in that the transmission includes at least two satellite wheels kinematically interconnected in series by means of at least an intermediate crankshaft installed in cantilever on bearings in a body, which is laterally equipped with an offset seat at a nutation angle θ with the common axis of the central wheels, the first satellite wheel by means of a bearing mounted on an end of its semi-axle is kinematically coupled with the crankshaft, and the second satellite wheel by means of a bearing mounted on the end of its semi-axle is kinematically coupled with the offset seat of the intermediate crankshaft at the nutation angle θ with the common axis of the central wheels.

The technical result includes:

Increasing the load-bearing capacity of the transmission by engaging the teeth in contacts with the convex-concave geometry and the minimum difference in the curvatures of the mating flanks, including by increasing the length of the total contact line of the inclined teeth;

Increasing the mechanical efficiency by changing the tooth shape, reducing the pressure angle between the flanks and at the expense of increasing the rolling share of the engaging teeth by decreasing the relative frictional sliding between the flanks with a reduction in the frontal overlap degree and a compensatory increase in the longitudinal overlap degree with pure rolling of teeth in the sphero-spatial interaction of the mating wheels with the nutation angle θ;

Extending kinematic and technological possibilities.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 14A-14C show the linear velocities in the contact point $V_{E1}$, $V_{E2}$, $V_{al}$ (a) and difference in the radii of curvature $(\rho_{ki}-r)$ (b) of the mating profiles in contact $k_i$ (c) depending on $\psi$ for $Z_1=Z_2-1$ and $\delta=22.5°$, $Z_1=24$, $Z_2=25$, $\theta=3.5°$, $\delta=22.5°$, r=6.27 mm and R=75 mm;

DETAILED DESCRIPTION OF THE EMBODIMENTS

A precessional gear transmission according to an embodiment includes a body, a satellite wheel with two bevel gear rings installed on the inclined portion of the crankshaft between two central bevel wheels, one immobile fixed in the body and the other mobile mounted on the driven shaft. The teeth gearing is performed in contact with convex-concave geometry. The central bevel wheels are made with curvilinear flank profiles with variable curvature with one tooth less than the satellite wheel gear rings made with circular arc flank profiles. The teeth flanks mate with frontal overlap $\varepsilon_f$ within the limits $1.5 \le \varepsilon_f \le 4.0$ simultaneously engaged pairs of teeth. At the same time the gearwheels are made with a conical axoid angle within the limits $0° \le \delta \le 30°$, with the angle between the axes of the crank and the central bevel wheels within the limits $1.5° \le \theta \le 7°$. The circular arc radius r of the flank profile of the Z-toothed satellite wheel gear rings is within the limits 1.0 D/Z [mm]≤r≤1.57D/Z [mm], which generally provides a reduction of the difference in the curvatures $(\rho_{ki}-r)$ of the flank profiles in the section with diameter D within the limits 0.02D/Z [mm]≤$(\rho_{ki}-r)$≤1.5D/Z [mm] and a decrease in the pressure angle α between the flanks of up to 15°, as well as a decrease in the relative sliding velocity between the mating flanks.

Figure 1A:
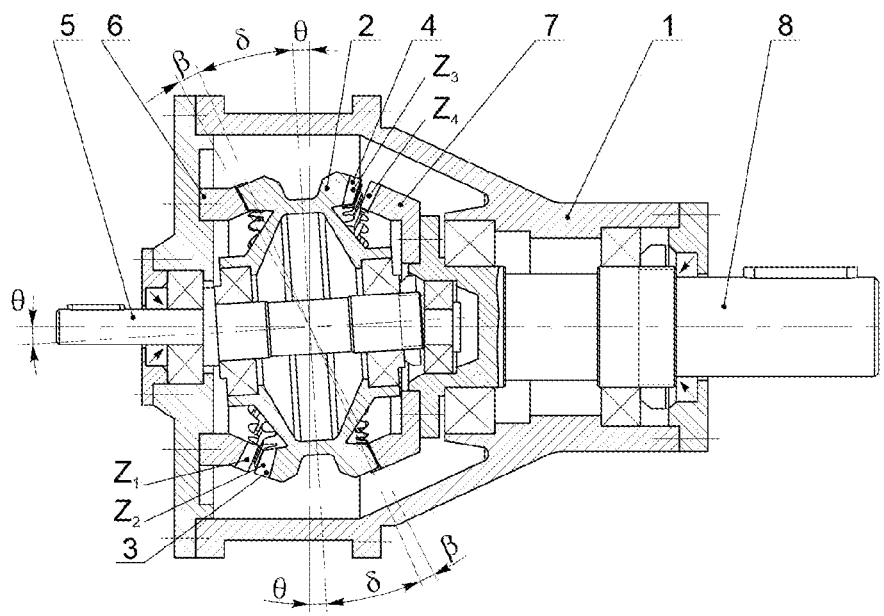
FIGS. 1A and 1B show a precessional toothed gear transmission.
Figure 1B:
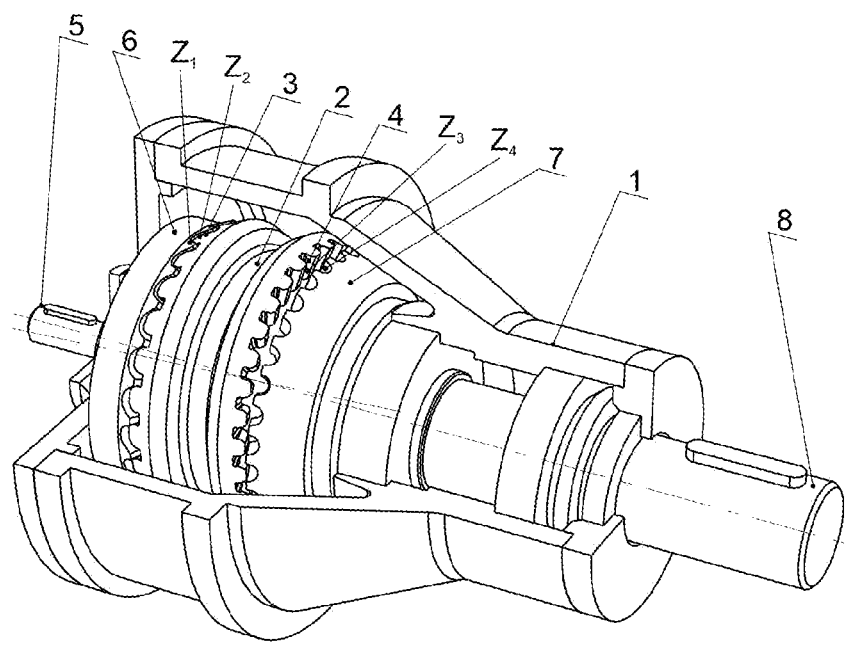

FIGS. 1A and 1B show the precessional gear transmission which comprises a body 1, a satellite wheel 2 with two bevel gear rings 3 and 4 installed on an inclined portion of a crankshaft 5, two central bevel wheels 6 and 7, one immobile 6, fixed in the body 1 and the other mobile 7, mounted on a driven shaft 8. A novelty of the invention includes that the teeth engage in contact with convex-concave geometry with a small difference in the curvatures of the flank profiles, wherein the central bevel wheels 6 and 7 are made with straight teeth and curvilinear flank profiles with variable curvature with one tooth less than the gear rings 3 and 4 of the satellite wheel 2 made with circular arc flank profiles, the flanks of the teeth mate with frontal overlap $\varepsilon_f$ within the limits $1.5 \leq \varepsilon_f \leq 4.0$ simultaneously engaged pairs of teeth, at the same time the gearwheels are made with the conical axoid angle within the limits $0° \leq \delta \leq 30°$, with the nutation angle $\theta$ between the axes of the crank 5 and the central bevel wheels 6 and 7 within the limits $1.5° \leq \theta \leq 7°$, and the circular arc radius r of the flank profile of the Z-toothed satellite wheel gear ring 2 is within the limits 1.0 D/Z [mm] $\leq r \leq 1.57 D/Z$ [mm], which generally provides for the mating of teeth in convex-concave contacts with the difference in the in the curvatures ($\rho_{ki}$−r) of the flank profiles in the section with diameter D within the limits 0.02D/Z [mm]$\leq$ ($\rho_{ki}$−r)$\leq$1.5D/Z [mm] and of the pressure angle $\alpha$ between the flanks of up to 15°, as well as a decrease in the relative sliding velocity between the mating flanks.

The bevel gear rings 3 and 4 of the satellite wheel 2 have teeth with circular arc flank profiles, and the central bevel wheels 6 and 7—variable curvilinear, depending on the angles $\theta$ and $\delta$, the circular arc radius r, the number and the ratio of the numbers of teeth of the gears ($Z_1$-$Z_2$) and ($Z_3$-$Z_4$), the configuration of the numerical values which influence the change of the teeth profile shape, determines their degree of frontal overlap, expressed by the number of simultaneously engaged pairs of teeth $\varepsilon_f$, the size of the pressure angle $\alpha$ between the mating flanks and the frictional sliding velocity between the flanks.

Figure 2A:
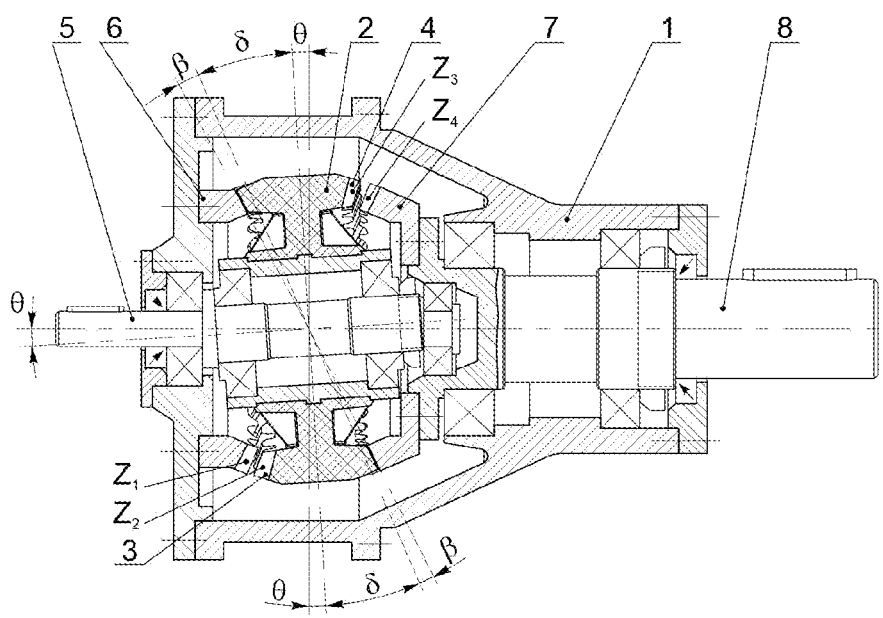
FIGS. 2A and 2B show a kinematic precessional toothed gear transmission; with wheels injected from plastics (a) and pressed from metal powders by sintering (b)
Figure 2B:
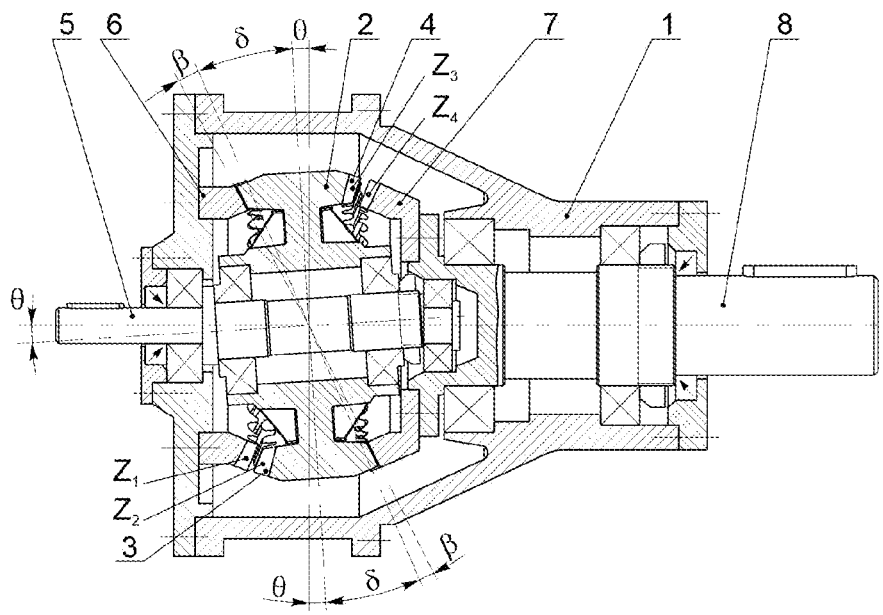

The following approaches to the creation of a precessional gear with gearwheels shown in FIGS. 1A and 1B are valid both for the kinematic transmissions with wheels injected from plastics and the kinematic transmissions with wheels pressed by sintering from metallic powders shown respectively in FIGS. 2A-2B.

The precessional gear transmission according to the invention operates in the following way: upon rotation of the crankshaft 5, the satellite wheel (FIGS. 1A-2B) communicates a sphero-spatial motion around a fixed point, which through its bevel gear rings 3 and 4 (and/or the gear ring 4 made of bolts), interacts with the fixed bevel gearwheel 6 and the mobile gearwheel 7, respectively.

The difference in the number of teeth of the engaged wheels is only one tooth, and the numerical ratio of teeth is:

$$Z_1 = Z_2 - 1 \text{ and } Z_4 = Z_3 - 1 \quad (1)$$

Due to the fact that the central bevel wheel 6 is fixed in the body 1, and the central bevel wheel 7 is mounted on the driven shaft 8, when rotating the crankshaft 5 with the electromotor rotational frequency, the driven shaft 8 will rotate with reduced rotational frequency with the transmission rat $i_{HV}^b$:

$$i_{HV}^b = -\frac{Z_2 Z_4}{Z_1 Z_3 - Z_2 Z_4}. \quad (2)$$

Generally, when transmitting the motion and load through the gears ($Z_1$-$Z_2$) and ($Z_3$-$Z_4$) with the ratio of the numbers of teeth $Z_{1(4)} = Z_{2(3)} \pm 1$, the direction of rotation of the driven shaft 8 coincides or not with the direction of the input crankshaft 5.

If $Z_2 > Z_3$, the crankshaft 5 and the driven shaft 8 rotate counterclockwise, and if $Z_2 < Z_3$, rotate in the same direction.

Frontal multiplicity of the mating wheel teeth gearing in the precessional transmission is determined by three interdependent constructive-kinematic conditions:

the satellite wheel performs a sphero-spatial motion with a fixed point, in which the extensions of the teeth generators of the engaged wheels intersect;

the difference between the number of teeth of the engaged wheels is $Z_1 = Z_2 \pm 1$ and $Z_4 = Z_3 \pm 1$, and the difference between the number of teeth of the satellite gear rings can be $Z_2 = Z_3 \pm 1$;

compliance with the continuity of the rotational motion transformation function, therefore $\omega_5/\omega_8$=const.

It was found that the absolute multiplicity of gearing (100%) with the compliance of the three conditions can only occur when using the variable convex/concave profile of the teeth flanks, usually of the central wheels, depending on the values of the conical axoid $\delta$ and nutation $\theta$ angles of radius r of the curvature of the teeth profiles of the satellite wheel gear rings, as well as on the number of teeth of the wheels Z and their ratio ±1 (see FIGS. 1A-2B).

The load-bearing capacity and mechanical efficiency of the precessional gear transmission, according to the invention, are increased by achieving the following technical solutions:

creating contacts between the teeth flanks with convex-concave geometry with small difference of curvatures;

providing the minimum pressure angles between the flanks of the engaged teeth;

providing the minimum relative frictional sliding velocity between the mating flanks;

decreasing the frontal gear multiplicity and increasing the degree of longitudinal overlap with pure rolling of the teeth in the sphero-spatial interaction of the mating wheels.

The constructive-kinematic conditions and the distinctive technical solutions mentioned above, constitute the basis for the development of the precessional gear transmission, for both the power transmissions shown in FIGS. 1A and 1B and the kinematic transmissions shown in FIGS. 2A-2B.

The elaboration of the precessional gear transmission in the embodiment according to the invention, cover the following approaches and technical solutions:

1. Creation of the Contact with Convex-Concave Geometry Between the Flanks of the Teeth with Small Difference of Curvatures.

For creating the convex-concave contact of the engaged teeth with sphero-spatial motion, the profile of the satellite wheel teeth 2 is described by an arbitrary curve LEM, for example, in circular arc of radius r with the origin in point G (FIG. 3), which belongs to the satellite wheel teeth 2.

From the Euler equations, taking into account the kinematic relation between the angles $\sigma$ and $\psi$ expressed by $\sigma = -Z_1/Z_2 \psi$, we obtain the coordinates of the origin G of the circular arc radius $X_G$, $Y_G$, $Z_G$ depending on the rotation angle $\psi$ of the crankshaft:

$$X_G = R\cos\delta\left[-\cos\psi\sin\left(\psi\frac{Z_1}{Z_2}\right) + \sin\psi\cos\left(\psi\frac{Z_1}{Z_2}\right)\cos\theta\right] - R\sin\delta\sin\psi\sin\theta, \quad (3)$$

$$Y_G = -R\cos\delta\left[\sin\psi\sin\left(\psi\frac{Z_1}{Z_2}\right) + \cos\psi\cos\left(\psi\frac{Z_1}{Z_2}\right)\cos\theta\right] + R\sin\delta\cos\psi\sin\theta, \quad (4)$$

$$Z_G = -R\cos\delta\cos\left(\psi\frac{Z_1}{Z_2}\right)\sin\theta - R\sin\delta\cos\theta. \quad (5)$$

Figure 3:
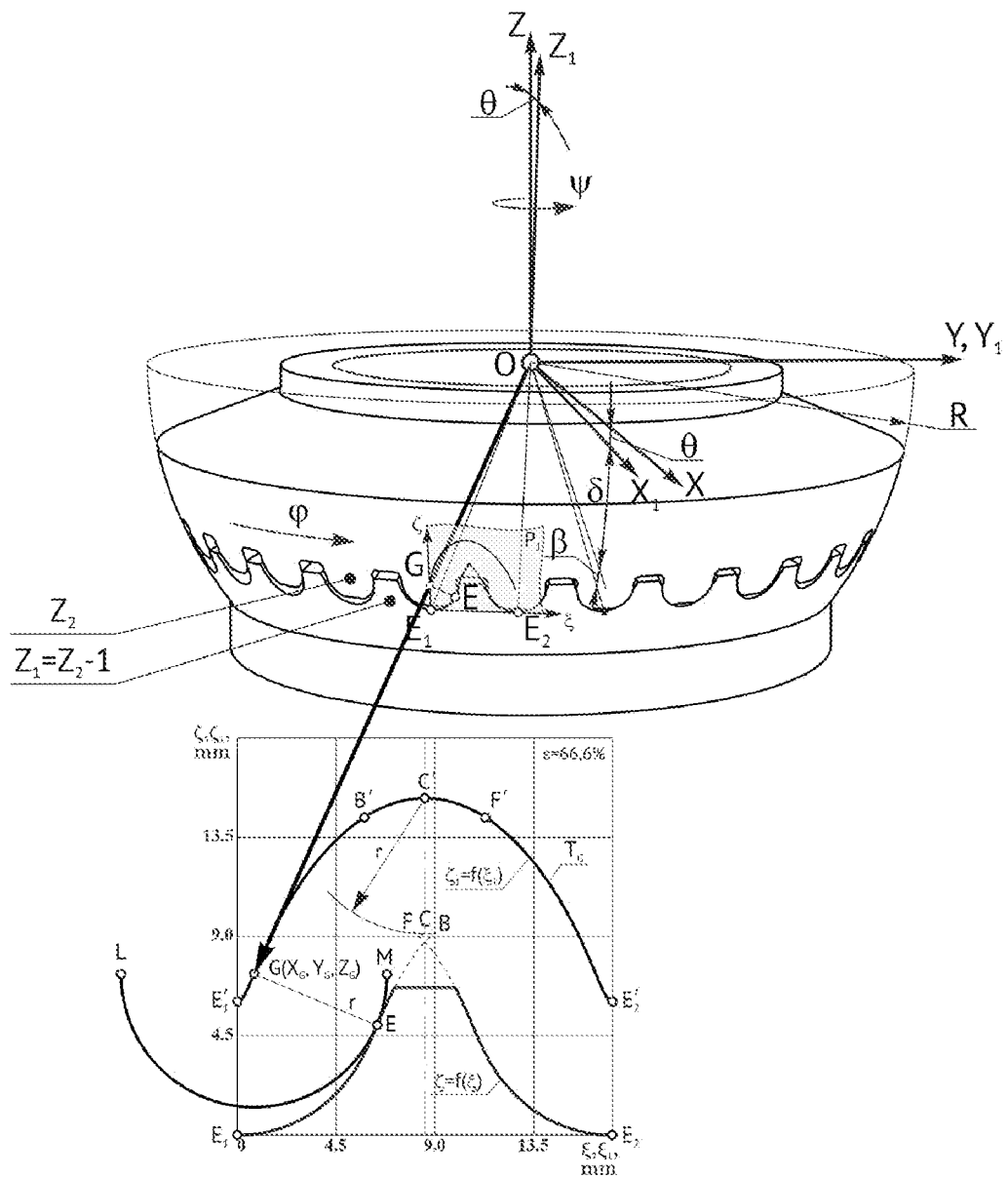
FIG. 3 illustrates a path of motion of a circular arc radius G origin.

The origin G of the circular arc radius, with which the teeth of the satellite wheel 2 gear rings 3 and 4 are arbitrarily described (see FIGS. 2A-2B), moves on the sphere surface with radius R with the origin in the center of precession O, describing the path $\zeta_1=f(\xi_1)$, expressed by the coordinates $X_G$, $Y_G$, $Z_G$ (FIG. 3).

The path of motion G of the circular arc LEM on the sphere with radius R is projected on the plane $P_1$ using the rules of spherical trigonometry. Thus, it is obtained the path $T_G$ of motion of the origin of the circular arc G radius on the plane $P_1$, expressed by the dependence $\zeta=f(\xi_1)$.

Knowing the path of motion of the origin of the circular arc G radius, expressed in the coordinates $X_G$, $Y_G$, $Z_G$ (FIG. 4), one can determine the position of the contact point E of the flank profiles of the mating teeth in the gears ($Z_1$-$Z_2$) and ($Z_3$-$Z_4$) for any angular position $\psi$ of the crankshaft 5.

The family of contact points E obtained in a precession cycle $0 \leq \psi \leq 2\pi Z_3/Z_4$ represents the profile of the teeth of the immobile 6 or mobile 7 central wheels.

To describe the flank profiles of the teeth of the central wheels 6 and 7, the projections of the velocity vector $V_G$ on the coordinate axes of the mobile system $OX_1Y_1Z_1$ are determined depending on the angular velocity of the crankshaft 5 (see FIGS. 1A-2B).

To determine the position of the contact point E of the teeth on the spherical surface, we identify the equation of a plane $P_2$ drawn perpendicular to the velocity vector $V_G$, passing through the center of precession O and the origin of the circular arc radius G. The equation of plane $P_2$ can be written by the expression:

$$[OG \times OC] \times V_G = 0, \quad (6)$$

where OG and OC are vectors that determine the position of the origin of the circular arc radius of curvature of the satellite tooth G and, respectively, of an arbitrary point C of plane $P_2$ with respect to the origin of the immobile coordinate system OXYZ (FIG. 3).

The vectorial product $[OG \times OC]$ (6) is expressed as a third-order determinant, and by opening it according to the elements of the first line, we obtain:

$$[OG \times OC] = i(Y_G Z - Z_G Y) + j(Z_G X - X_G Z) + k(X_G Y - Y_G X), \quad (7)$$

wherein $X_G, Y_G, Z_G$ are the coordinates of the origin of the radius of curvature G of the circular arc profile of the satellite wheel teeth; X,Y,Z—the coordinates of the arbitrary point C on the plane $P_2$.

If the contact point of the teeth E is placed on the sphere with the radius R, then its coordinates satisfy the equation:

$$X_E^2 + Y_E^2 + Z_E^2 - R^2 = 0. \quad (8)$$

Figure 4:
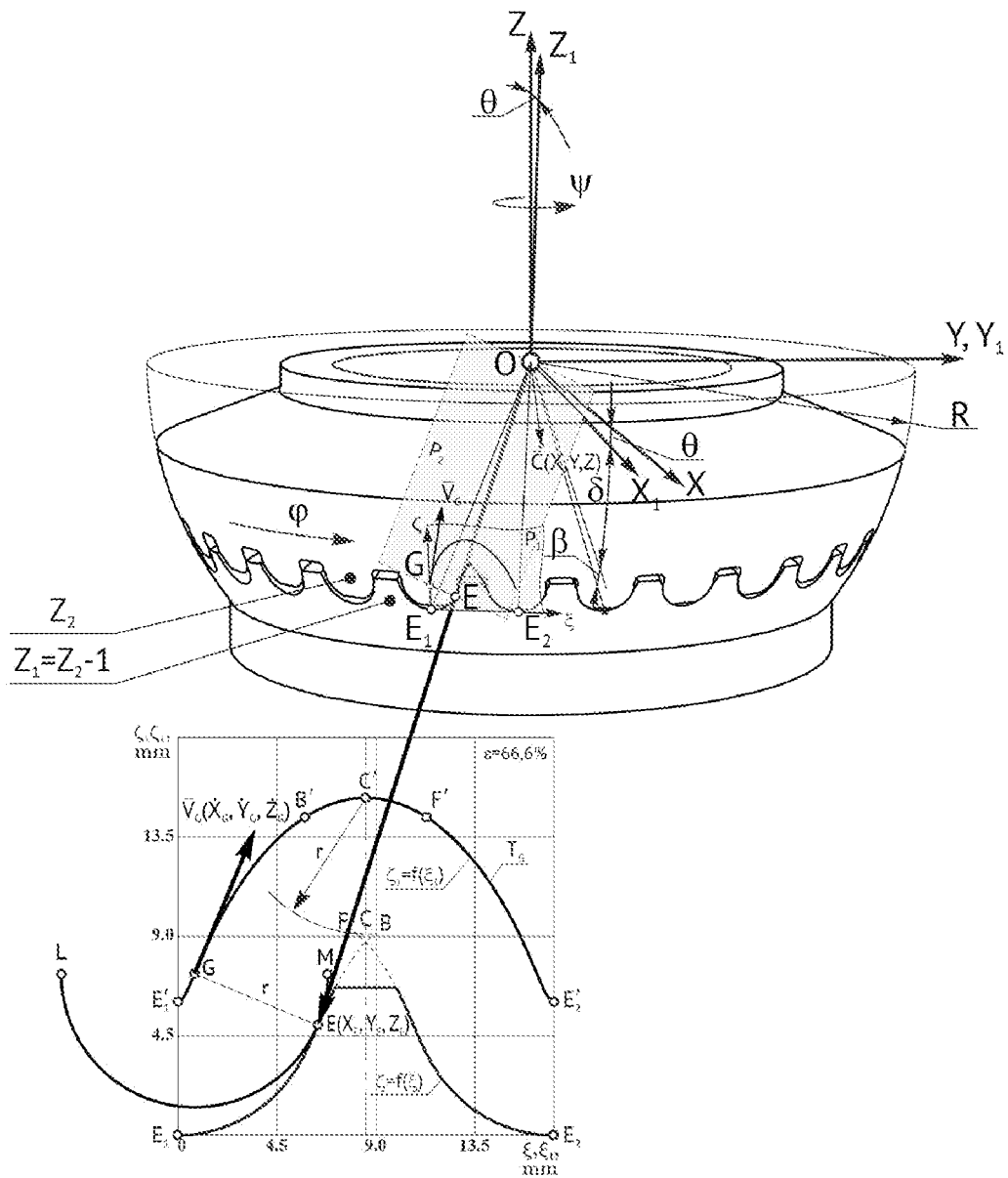
FIG. 4 shows a flank profile of the central wheel teeth.

From FIG. 4, we observe that the angle between the position vectors of the origin of the circular arc radius of curvature OG of the satellite tooth and the position vector of the contact point E of the teeth OE represents the angle of contact $\beta$ from the center of precession O of the radius r of the circular arc profile of the satellite wheel teeth, from which results:

$$OG \cdot OE = R^2 \cos \beta \quad (9)$$

or $$X_E Z_G + X_E Y_G + Z_E Z_G - R^2 \cos \beta = 0. \quad (10)$$

From the equation (12) we determine:

$$X_E = (R^2 \cos \beta - Y_E Y_G - Z_E Z_G)/X_G. \quad (11)$$

To determine the coordinate $Y_E$ of the contact point of the teeth E, we substitute (11) in (8) and obtain:

$$Y_E = k_1 Z_E - d_1, \quad (12)$$

and by substituting (12) into (11), we obtain the expression of the contact point coordinate $X_E$:

$$X_E = k_2 Z_E + d_2, \quad (13)$$

where $$k_1 = [X_G(X_G \dot{X}_G + Y_G \dot{Y}_G) + Z_G^2 \dot{X}_G]/(X_G \dot{Y}_G - Y_G \dot{X}_G)Z_G$$

$$d_1 = R^2 \cos \beta \dot{X}_G/(X_G \dot{X}_G - Y_G \dot{X}_G)$$

$$k_2 = -(k_1 Y_G + Z_G)/X_G$$

$$d_2 = (R^2 \cos \beta + d_1 Y_G)/X_G. \quad (14)$$

Substituting (12) and (13) in (8) and, considering that the profile curve of the central wheel teeth is equidistant from the path of motion of the origin G of the circular arc radius, and for any rotation angle $\psi$ of the crankshaft 5, the condition $Z_E < Z_G$ must be met, the coordinate $Z_E$ can be determined by the relation:

$$Z_E = \frac{(k_1 d_1 - k_2 d_2) - [(k_1 d_1 - k_2 d_2)^2 + (k_1^2 + k_2^2 + 1)(R^2 - d_1^2 - d_2^2)]^{1/2}}{(k_1^2 + k_2^2 + 1)}. \quad (15)$$

Relationships (12), (13) and (15) determine the coordinates $X_E$, $Y_E$ and $Z_E$ of the contact point E of the teeth, the set of which in a precession cycle represents the flank profile of the central wheel teeth, placed on the sphere of radius R.

From the analysis of equations (12), (13) and (15), we state that the flank profile of the central wheel teeth is variable depending on the number of teeth $Z_2$, the ratio of the numbers of teeth of the engaged wheels $Z_1 = Z_2 - 1$ or $Z_1 = Z_2 + 1$, the conical axoid $\delta$, nutation $\theta$ and contact angles at the center of precession of the radius of curvature of the circular arc profile $\beta$ of the satellite wheel teeth.

The precessional gear being bevel, with the extensions of the generators intersected in the center of precession, it is appropriate to render the teeth profile in normal section, for example, in the plane $P_1$ drawn by the points $E_1$ and $E_2$ perpendicular to the plane $OE_1E_2$ (FIG. 4).

The coordinates $X_E, Y_E$ and $Z_E$ of points $E_1$ and $E_2$ on the teeth profile on the sphere are determined from the relations (12), (13) and (15) for the angles of precession $\psi = 0$ and $\psi = 2\pi Z_2/Z_1$, corresponding to a precession cycle.

Using the rules of spherical trigonometry, we design the teeth profile on the sphere with the radius R on the plane $P_1$.

Figure 5A:
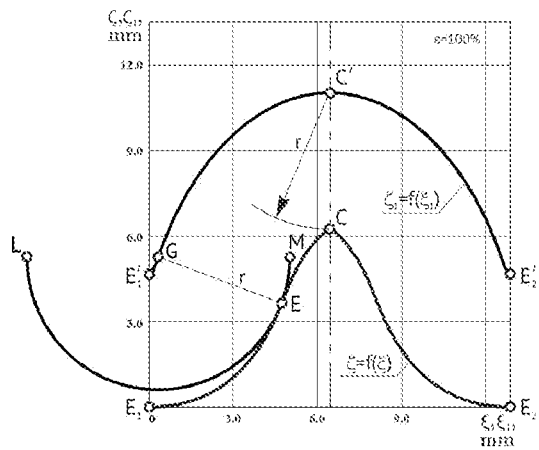
FIGS. 5A and 5B show teeth contact in the precessional toothed gear with frontal reference multiplicity $\varepsilon_f=100\%$ (a) and $\varepsilon_f=66.6\%$ (b)
Figure 5B:
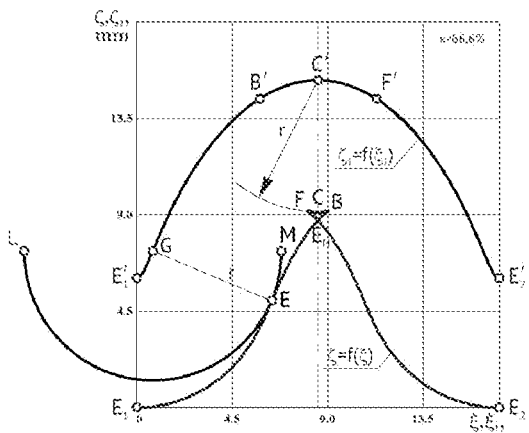

To design the profile of the central wheel teeth in two coordinates $\zeta$ and $\xi$ in the plane $P_1$ we draw the coordinate system $E_1 \xi \zeta$ with the origin in point $E_1$, whose axis $E_1 \xi$ passes through point $E_2$ (FIGS. 5A-5B). From coordinates $X_N$, $Y_N$ and $Z_N$ we pass to coordinates $\zeta$ and $\xi$ using the relations:

$$\xi = \frac{[(E_1 E_2)^2 + v_1^2 - v_2^2]}{2(E_1 E_2)}, \quad \zeta = \sqrt{v_1^2 - \xi^2}. \quad (16)$$

The expressions (16) represent the coordinates of the curve points, whose family constitute the flank profile of the central wheel teeth, designed on the plane $P_1$, expressed in parametric form with the variation of the precession angle from $\psi = 0$ to $\psi = 360 \cdot Z_2/Z_1^2 [°]$.

To design the path of motion of the origin of the circular arcs G in 2D, we pass from coordinates $X_N$, $Y_N$ and $Z_N$ to Cartesian coordinates $\xi_1$, $\zeta_1$ using the relations:

$$\xi_1 = \frac{[(E_1E_2)^2 + S_1^2 - S_2^2]}{2(E_1E_2)}, \zeta_1 = \sqrt{S_1^2 - \xi_1^2}. \quad (17)$$

Function $\xi_1$ of $\zeta_1$ (17) represents the projection of the path of motion of the origin of the circular arcs G on the plane $P_1$, and function $\xi$ of $\zeta$ (16) represents the flank profile of the central wheel teeth projected on the plane $P_1$.

The value configuration of parameters Z, r, δ and θ influences the shape of the flank profile of the central wheel teeth and provides for the teeth front reference gear of up to 100% simultaneously engaged pairs of teeth. In the precessional transmission shown in FIGS. 1A and 1B, the teeth gears ($Z_1$-$Z_2$) and ($Z_3$-$Z_4$) may be with the same or different reference multiplicity of the teeth gearing.

2. Transformation of Teeth Contact Geometry into the Precessional Gear Depending on the Angle of Precession ψ and Distinctive Solutions for Creating the Convex-Concave Contact with Small Difference of Curvatures.

The profiles of the central wheel teeth are presented by the functions $\zeta=f(\xi)$ constructed according to the relations (17), and of the satellite teeth are prescribed in circular arc with radius r.

The generalizing shape parameters of the teeth contact in the gears of the mechanical transmissions are the radius of equivalent curvature of the teeth profiles and the difference parameters of the curvatures of the mating flanks.

In designing the teeth contact geometry in the precessional gear, it was admitted that LEM is a circular arc shaped-curve (FIGS. 5A-5B), which prescribes the teeth profile of the satellite gear rings with sphero-spatial motion with a fixed point, and the curve $E_1ECE_2$ (FIG. 6A) represents the flank profile of the central wheel teeth, expressed by the evolutes of the circular arc families LEM of radius r with the origin G located on the path of its motion within a precession cycle $0 \leq \psi \leq 2\pi Z_2/Z_1$.

To address the degree of influence of the gear geometric and kinematic parameters on the teeth contact geometry and the kinematics of their contact analyses for gears with concrete parameters will be presented.

FIGS. 5A-5B show profilograms of the flank profiles contact of the mating teeth projected on the plane $P_1$, in which pairs of teeth concomitantly engage 100% (FIG. 5A) and 66.6% respectively (FIG. 5B) called frontal reference multiplicity of gear.

In the sphero-spatial movement of the satellite wheel, in the position of the crankshaft 5 with the precession angle ψ=0°, the satellite teeth circular arc profile LEM comes in contact with the active profile of the central wheel teeth $E_1EC$ in point E (FIG. 5A) or with the active profile of the teeth $E_1EE_N$ (FIG. 5B). As the precession angle $0 \leq \psi \leq \pi Z_2/Z_1$ increases, the contact point E of the circular arcs LEM and of the active profile $E_1EC$ of the central wheel teeth migrate from point $E_1$, when ψ=0°, to point C, when $\psi=\pi Z_2/Z_1$ (FIG. 5A), or to point $E_N$ (FIG. 5B).

Figure 6A:
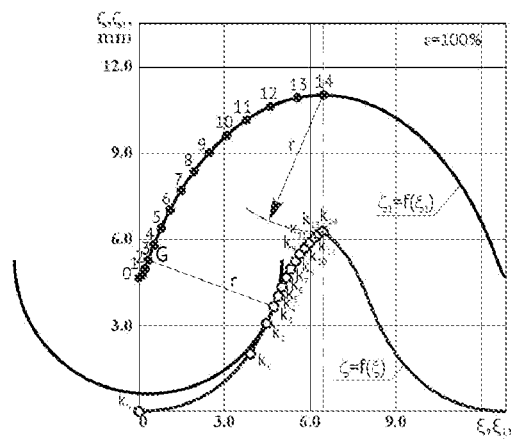
FIGS. 6A and 6B show evolution of the contact point of teeth in the gears with frontal reference multiplicity $\varepsilon_f=100\%$ (a) and $\varepsilon_f=66.6\%$ (b)
Figure 6B:
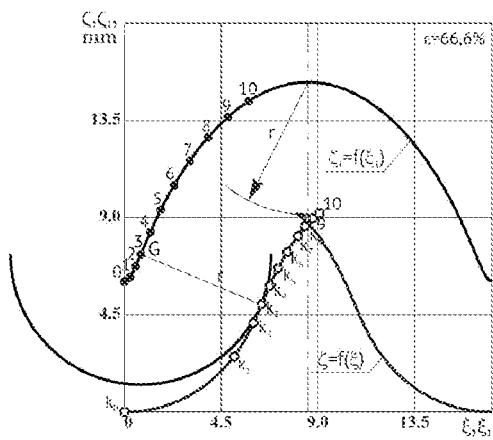

Geometrically, the location of the contact points E (FIGS. 5A-5B) of the satellite wheel teeth profiles on the active profile of the central wheel teeth is defined by the precession angle ψ of the crankshaft with the location shown in FIGS. 6A-6B: (a)—for the gear with frontal reference multiplicity $\varepsilon_f$=100% (a) and (b)—for the gear with $\varepsilon_f$=66.6%. On the curves $\zeta_1=f(\xi_1)$ the origins of the circular arcs G of the satellite teeth profile are located, and on the curves $\zeta=f(\xi)$—the contacts $k_1, k_2, k_3 \ldots k_n$ of the pairs of simultaneously engaged satellite—central wheel teeth at different angular positions of the crankshaft 5 are located.

The positions of the origins of the circular arcs G placed on the curve $\zeta_1=f(\xi_1)$, denoted by p. 1, 2, 3 . . . i, correspond to the precession angles ψ of the crankshaft increasing from one pair of teeth to another with the angular pitch $\psi=360 \cdot Z_2/Z_1^2$[°].

Depending on the satellite precession phase, determined by the precession angle ψ of the crankshaft, each pair of satellite—central wheel teeth passes through three geometrical contact forms, namely from convex-concave in contacts $k_0$, $k_1$ and $k_2$, located in the dedendum area of the central wheel teeth, to convex-rectilinear in contacts $k_3$ and $k_4$, located in the passage area of the central wheel teeth profile from concave curvature to convex and convex-convex curvature in contacts $k_5 \ldots k_{14}$ (FIG. 6A) and $k_5 \ldots k_8$ respectively (FIG. 6B), located in the tip area of the central wheel teeth.

According to the invention, for increasing the load-bearing capacity of the teeth contact, a convex-concave geometrical shape is proposed, and considering the classical theory of contact between deformable bodies, the difference of the radii of curvature of the conjugated tooth flank profiles should be minimal. This feature in precessional gear transmissions is achievable by two interdependent solutions: first—by varying, selecting the configuration of parameters $Z_1$, $Z_2$, δ, θ and r, which determines the shape of the central wheel tooth profile, and second—by excluding from the gear the pairs of teeth with convex-convex and/or convex-rectilinear geometrical contact, with extension of the teeth contact area with convex-concave geometry.

Figure 7A:
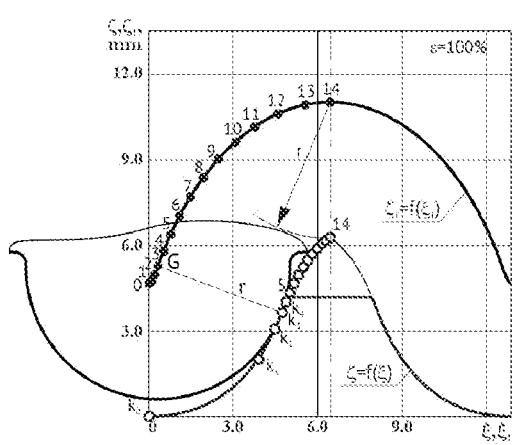
FIGS. 7A and 7B show a geometry of the modified teeth by making the tips in the gear with frontal reference multiplicity $\varepsilon_f=100\%$ (a) and $\varepsilon_f=66.6\%$ (b)
Figure 7B:
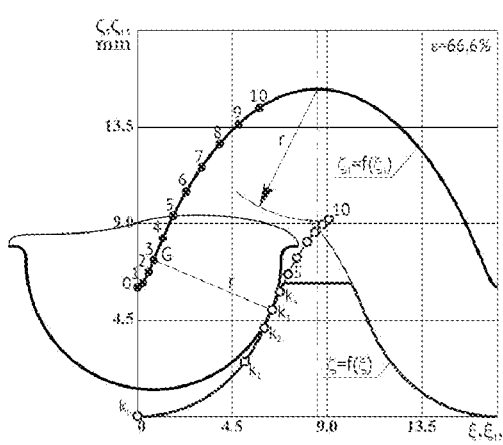

From the analysis of FIGS. 5A-6B, the convex-convex and convex-rectilinear contacts are characteristic for the flank mating with the tip area of the central wheel teeth. Using this geometrical aspect, it is possible to change the tooth shape, implicitly of the performance characteristics of the contact, by shortening its height to a level that would only provide a convex-concave contact (FIGS. 7A-7B).

Modifying the shape of the central wheel tooth by shortening its height (FIG. 8), the teeth flanks mate in convex-concave contact to the limit in point $k_2$ (FIG. 8), and in the area between it and the tip of the modified tooth, the flanks mate in convex-rectilinear contact. Therefore, depending on the modified height of the central wheel teeth and the parametric configuration Z, δ, β, θ, ±1 that would provide the transformation of motion with constant transmission ratio, we can provide single, two-pair, three-pair gear, etc., i.e. we can intervene on the frontal and reference gear multiplicity.

Figure 8:
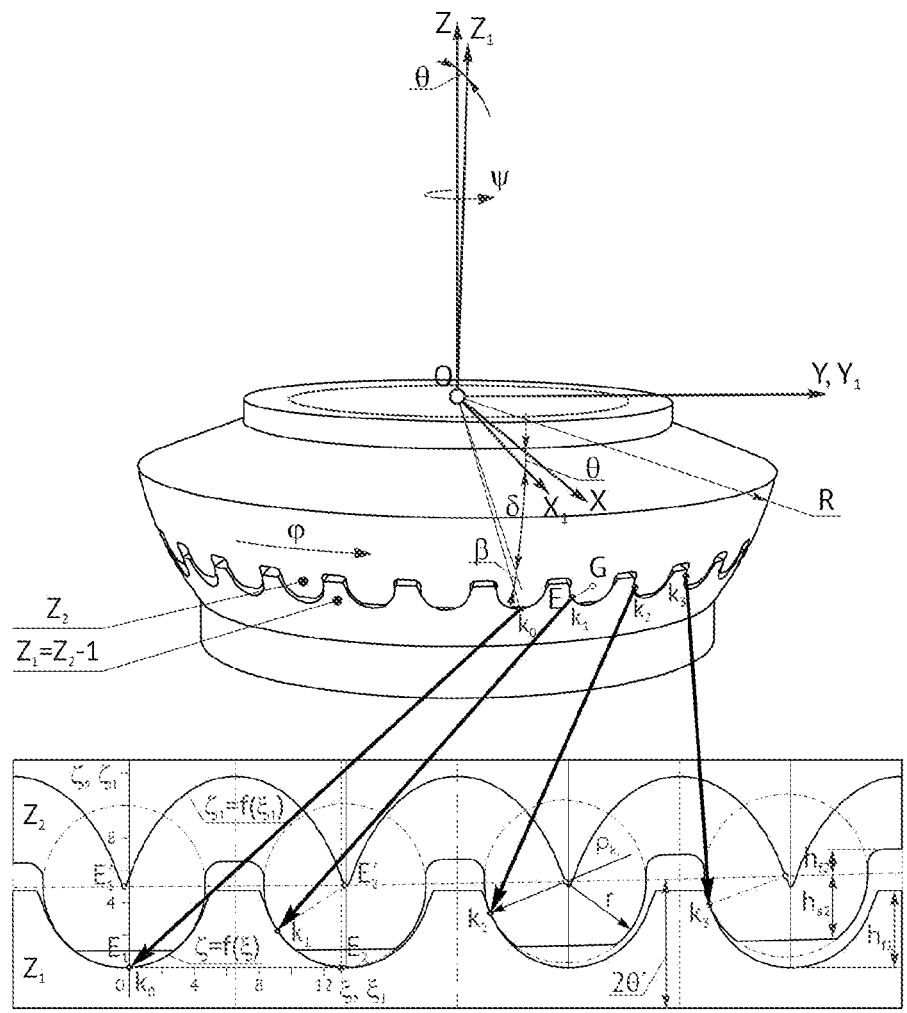
FIG. 8 shows a convex-concave gear with slight difference in curvatures of mating flank profiles with frontal multiplicity $\varepsilon_f=27.58\%$.

Based on the computer simulations on virtual models, it was found that when varying the precession angle of the crankshaft $0 \leq \psi \leq 37°$, the convex-concave contact is provided in the engaged pairs of teeth in the contacts $k_0$, $k_1$, $k_2$ and $k_3$, presented in the tooth profilogram evolute in FIG. 8.

Thus, for example, for the gear with geometric parameters $Z_1$=29, $Z_2$=30, R=75 mm, r=5.0 mm, θ=2.5°, δ=30°, β=3.8°, the teeth contact has the following geometry (FIG. 9): in contact $k_0$ corresponding to the crankshaft precession angle ψ=0°, the difference of the radii of curvature between the central wheel and satellite wheel profiles $\rho_1$-r=5.26-5.0=0.26 mm in the contact point $k_1$ corresponding to the precession angle ψ=12.84°; $\rho_1$-r=5.78-5.0=0.78 mm (first pair of engaged teeth); in the contact point $k_2$ corresponding to the precession angle ψ=5.68°, $\rho_1$-r=11.3-5.0=6.3 mm (second pair of engaged teeth); in the contact point $k_3$ corresponding to the precession angle ψ=38.53°, $\rho_i$-r=225-5.0=220 mm (third pair of engaged teeth, etc.).

By varying the parameters Z, β, δ, θ and the tooth ratio ±1 by changing the shape of the central wheel teeth, a single, two-pair, three-pair or four-pair precessional toothed gear is designed. In the three-pair gear shown in FIG. 9, when the crankshaft rotates, the contact point of each pair of teeth improvise an oscillatory motion along a path with the amplitude $A=Rtg\theta$, the period $P=2\pi RZ_2/Z_1$ and the origin in point $k_0$, and the concomitant gear area of the load-bearing teeth extends from contact $k_0$ to $k_i$.

When the crankshaft rotates, each pair of teeth in contacts $k_i$ performs an improvised motion along the same path, moving imaginary, for example, from contact $k_0$ of the satellite tooth on the bottom of the central wheel tooth (FIG. 8) to contact $k_0$ formed by the pair of teeth (preceding) after crankshaft rotation with the angle $\psi=360\cdot Z_2/Z_1{}^2[°]$. In this evolution, while the position angle $\psi$ of the crankshaft increases in the interval $0\leq\psi\leq 360\cdot Z_2/Z_1{}^2[°]$, contact $k_1$ moves to the position of contact $k_0$ (see $k_0$ from the previous pair of teeth, mated on the bottom of the central wheel tooth), contact $k_2$– to $k_1$, contact $k_3$– to $k_2$, and the pair of teeth preceding the first three forms a new contact $k_3$ and so on, so that a constant number of pairs of teeth is kept in the concomitant gear. The simultaneously engaged pairs of teeth, in the precessional motion of the satellite, are kept as a constant (predetermined) number, and their contacts migrate, following the principle of similarity between them according to $\psi$.

In classical mechanical transmissions, to provide the transformation of motion with constant transmission ratio, it is necessary that when one pair of teeth disengages, the preceding pair is already engaged, thus the degree of overlap $\varepsilon>1$ is provided.

Figure 9:
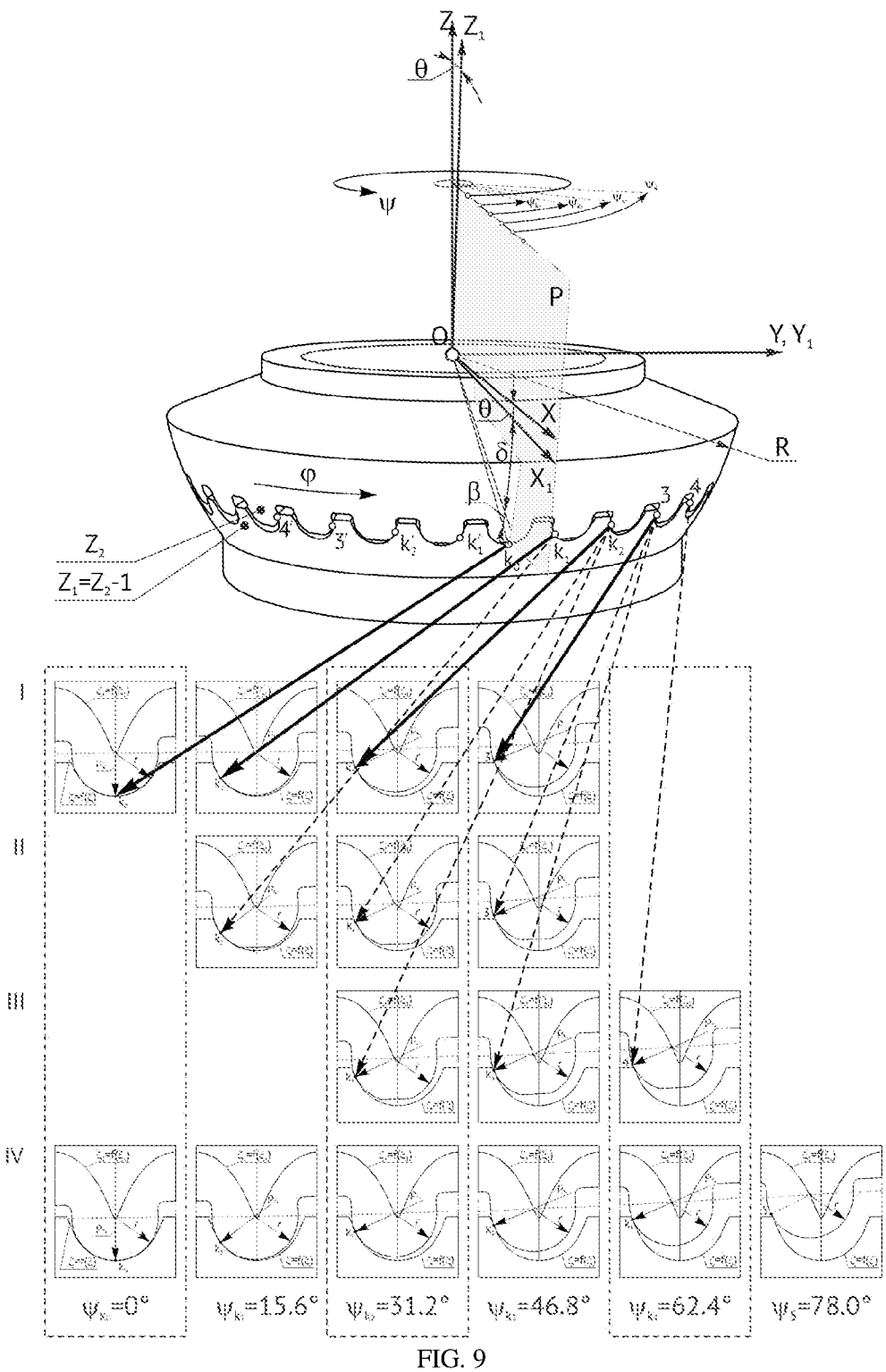
FIG. 9 shows the evolution of the teeth contact geometry variation with three, two and four simultaneously engaged pairs of teeth.

In the precessional toothed gear shown in FIG. 9, four pairs of load transmitting teeth and four passive pairs of teeth (do not transmit load), located on both sides of the contact, are concomitantly engaging. When the crankshaft rotates, the engaged pair of teeth in contact $k_0$ disengages, and the pair with position 5 forms a new load-bearing contact $k_4$, thus constantly maintaining four pairs of load-bearing teeth.

According to FIG. 9, each of the four simultaneously engaged pairs of teeth has angular coordinates expressed by crankshaft positioning according to the center angles $\psi_{k_1} \ldots \psi_{k_4}$ rising from contact to contact with the pitch $\psi=360\cdot Z_2/Z_1{}^2[°]$. All four pairs of teeth required with load rotate around the axis Z with the angular velocity $\dot\psi$ and the starting coordinate located in the plane P passing through the contact $k_0$.

FIG. 9 shows the positions of contacts $k_0 \ldots k_4$ and point 5 on the satellite teeth profile corresponding to the positioning angles $\psi_{k_0}=0°$, $\psi_{k_1}=15.6°$, $\psi_{k_2}=31.2°$, $\psi_{k_3}=46.8°$, $\psi_{k_4}62.4°$, and $\psi_{k_5}=78.0°$, determined from the relation $\psi_{k_i}=360iZ_2/Z_1{}^2[°]$, where $i=0,1,2,3,4\ldots$ is the contact order number. The difference in the radii of curvature of the engaged flanks is calculated by alternation, varying the geometric parameters Z, δ, β, θ and the teeth ratio ±1.

It is worth mentioning that analogously with the precessional toothed gear with four simultaneously engaged pairs of teeth shown in FIG. 9, gears with three, two and one pair of engaging teeth can be designed, correspondingly changing the shape of the central wheel and satellite teeth profile by respectively shortening the height of the teeth of both engaged wheels.

3. Influence of the Ratio of the Numbers of Teeth of the Mating Wheels on the Linematics of the Contact Point and Shape of the Tooth Flank Profile.

In precessional toothed gears, unlike those with bolts, the transformation and transmission of motion and load occur with the presence of relative frictional sliding between the teeth flanks, depending on the kinematics of the teeth contact point, in particular on the ratio of the numbers of teeth of the mating gear rings $Z_1=Z_2-1$ or $Z_1=Z_2+1$.

Therefore, the calculation and design of precessional toothed gears, unlike classical, including precessional toothed gears with bolts, include a separate algorithm for designing the teeth contact geometry, which generally defines the load-load-bearing capacity and mechanical efficiency of the transmission.

Figure 10A:
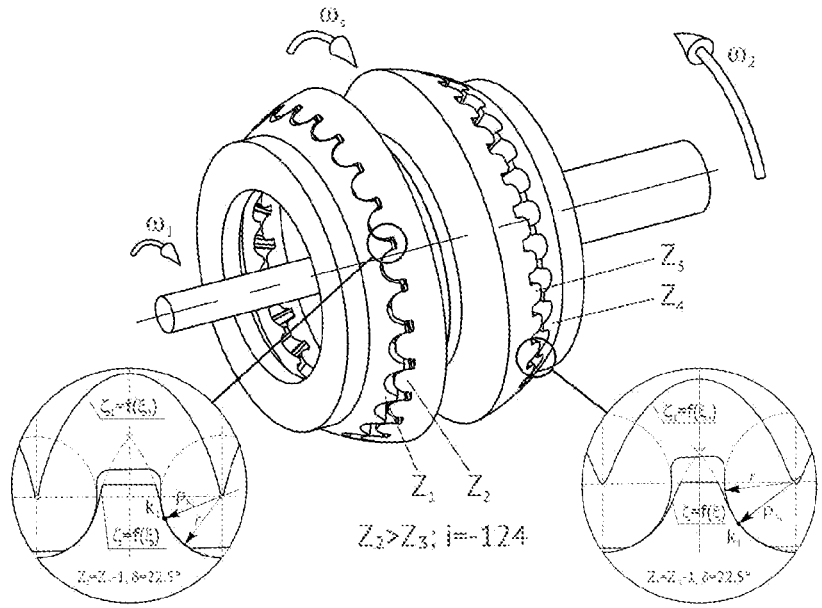
FIGS. 10A and 10B illustrate kinematics and tooth profiles of the gears $(Z_1-Z_2)$ and $(Z_3-Z_4)$ with reduction gearbox (a) and multiplier (b) operation modes.
Figure 10B:
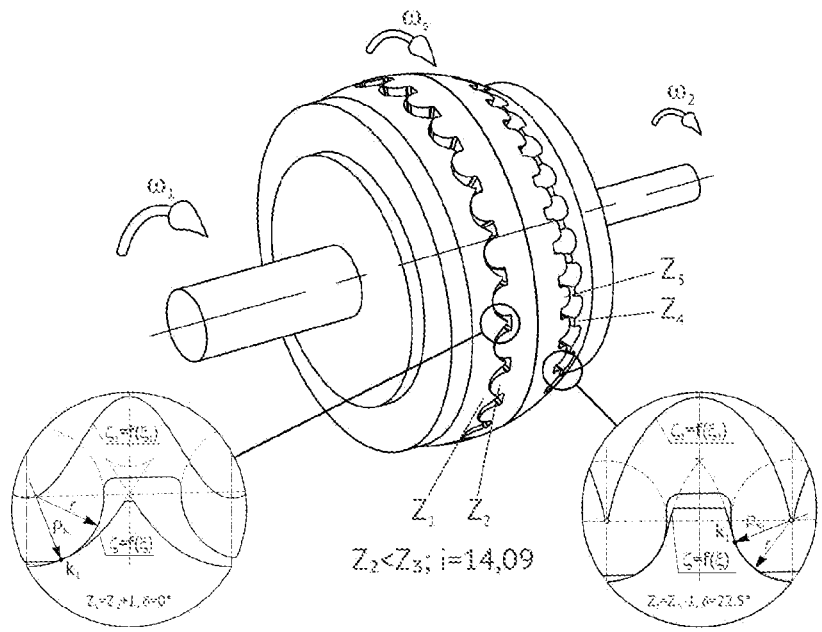

The design of the teeth contact geometry from the precessional toothed gear is limited to the identification of the contact form (see FIGS. 10A-10B) and the parameters of its geometry, determination of the kinematics of the flanks contact point considered as a tribosystem—all being subjected to the purpose of increasing the load-load-bearing capacity and mechanical efficiency of the teeth contact.

Figure 11A:
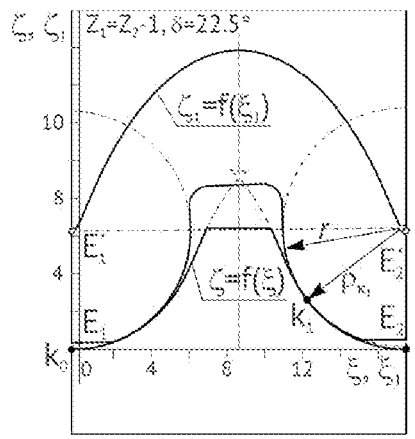
FIGS. 11A-11C show the geometry of the teeth contact and relative positioning of the mating flanks in contact $k_1$ $Z_1=Z_2-1$, $\delta=22.5°$; b) $Z_1=Z_2+1$, $\delta=0°$, c) $Z_1=Z_2+1$, $\delta=22.5°$.
Figure 11B:
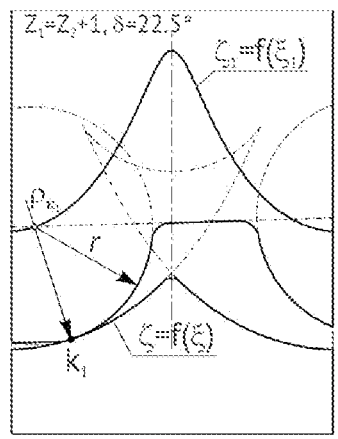
Figure 11C:
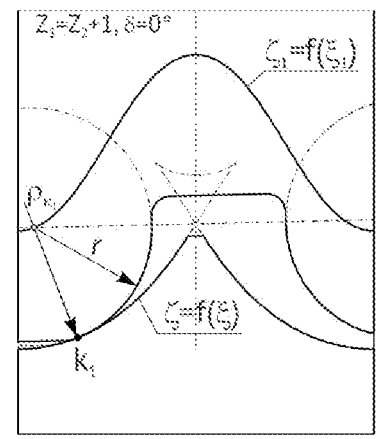

FIG. 11A shows the profilogram of the mating wheel teeth for the configuration of parameters $Z_1=24$, $Z_2=25$, $\theta=3.5°$, $\delta=22.5°$, $r=6.27$ mm, $R=75$ mm and the ratio of the number of teeth $Z_1=Z_2-1$. In FIG. 11B in the configuration of parameters, the ratio of the number of teeth $Z_1=Z_2+1$ differs, i.e. $Z_1=25$ and $Z_2=24$ and $\delta=0°$, and in FIG. 11C, the ratio of the number of teeth $Z_1=Z_2+1$ and the conical axoid angle $\delta=22.3°$ differs.

4. Reduction of the Pressure Angle Between the Mating Flank Profiles.

Figure 12A:
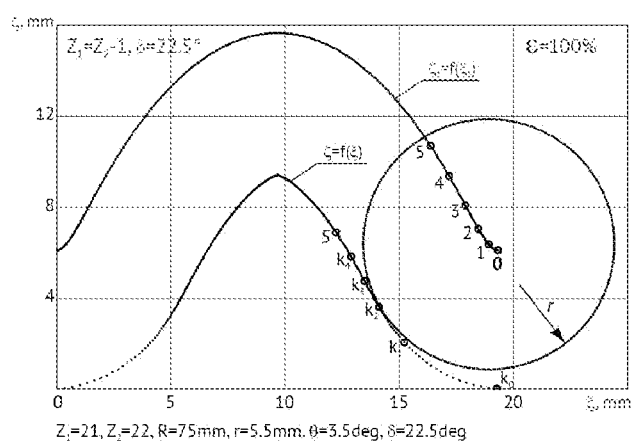
FIGS. 12A and 12B show the profiles and pressure angle between the flanks of the central wheel teeth with reference multiplicity $\varepsilon_f=100\%$ (a) and $\varepsilon_f=73\%$ (b)
Figure 12B:
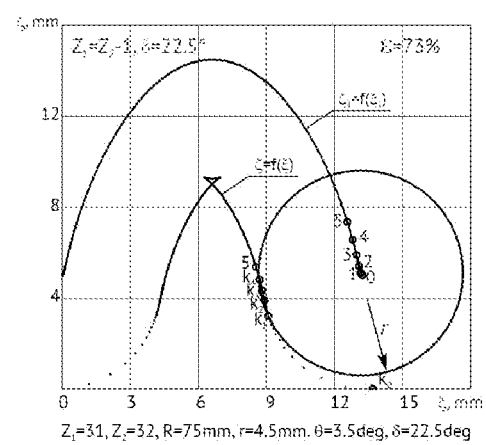

From FIGS. 12A-12B it can be seen that in the precessional gear depending on the parameters Z, δ, θ, r and $Z_1=Z_2-1$ (a) and the reference multiplicity $\varepsilon_f=100\%$, the contact points $k_0 \ldots k_5$ of the teeth flanks are placed on the portion of the central wheel teeth profile with the pressure angle between the flanks $\alpha=31°$, and for parameters (b) and $\varepsilon_f=73\%$, $\alpha=14°$. Decreasing the pressure angle α leads to a decrease in the static and dynamic load from the shaft and satellite wheel bearings.

Unlike the classical ones, in the precessional gear transmission, the profile of the central wheel teeth is variable, which leads to the variation of the teeth contact geometry in one and the same gear, passing from one form to another, namely from convex-concave at the dedendum of central wheel tooth to convex-rectilinear towards the middle of the tooth and convex-convex towards the tip of tooth.

5. Relative Sliding Between the Teeth Flanks in Gear.

The kinematics of the teeth contact point in precessional gears and the geometric shape of the mating flanks are two determining characteristics of the mechanical efficiency and the load-load-bearing capacity of the contact.

The mechanical efficiency of the gear is the expression of energy losses generated by the frictional sliding forces between the mating flanks, and the load-bearing capacity of the convex-concave contact results from the size of the difference in their radii of curvature.

Figure 13A:
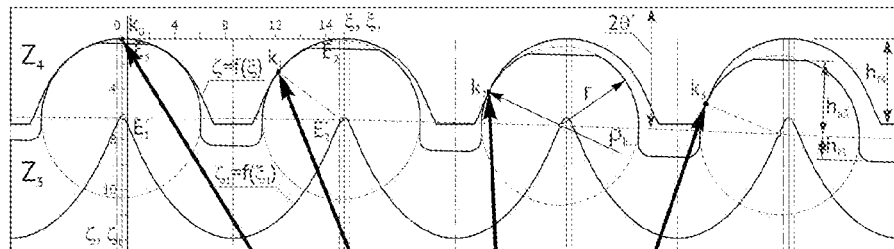
FIGS. 13A and 13B illustrate the kinematics and geometry of the teeth contact in the gear $(Z_3-Z_4)$ with $(Z_4=Z-1)$ (a) and gear $(Z_1-Z_2)$ with $(Z_1=Z_2-1)$ (c) with three simultaneously engaged pairs of teeth.
Figure 13B:
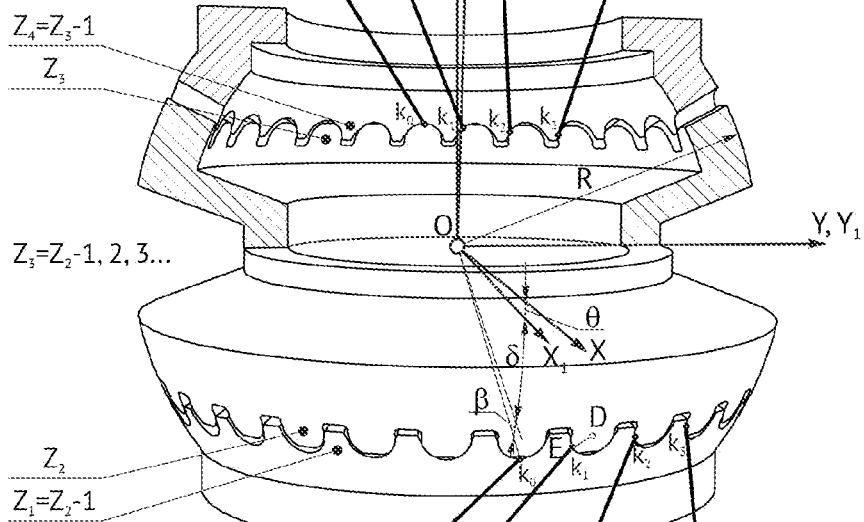
Figure 13B:
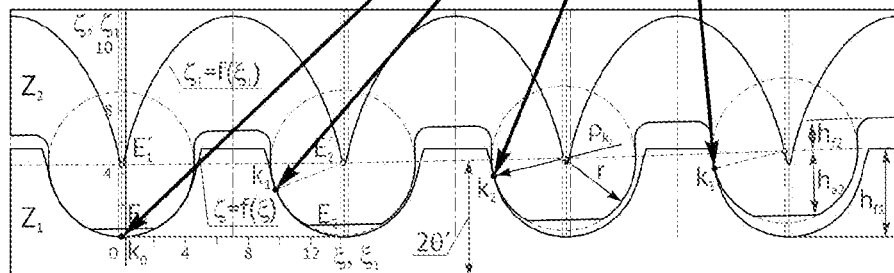

For these reasons, the gear contact kinematics and geometry (FIGS. 13A-13B) are examined for gears with different parametric configurations Z, δ, β, θ between them only by the ratio of the numbers of teeth $Z_1=Z_2\pm1$ and the conical axoid angle $\delta\geq0°$. From the aforesaid, the generalized configuration can be expressed by the parameters $Z_1=24(25)$, $Z_2=25(24)$, $\theta=3.5°$, $\delta=22.5°$ (0°), $r=6.27$ mm and $R=75$ mm.

The analysis of kinematics in the contact points $k_0$, $k_1$, $k_2 \ldots k_i$ corresponding to the crankshaft positioning angles takes place by varying the linear velocities of the contact points $E_1$ on the central wheel teeth profile and $E_2$ on the satellite teeth profile and the relative sliding velocity between the flanks $V_{al_{k_i}}$, and the teeth contact geometry is presented through the radii of curvature $\rho_{k_i}$ of the central wheel teeth profile and the satellite teeth profile r and their difference ($\rho_1$-r). Analysis of the teeth contact kinematics is performed for the crankshaft speed $m_1$=3000 min$^{-1}$.

Thus, in the gear Z, δ, β, θ with the ratio of the numbers of teeth $Z_1=Z_2-1$ and the conical axoid angle δ=22.5°, shown in FIG. 14A, in the teeth contact $k_0$ the linear velocity is $V_{E_1}$=9.83 m/s, $V_{E_2}$=9.69 m/s, $V_{al_{k_0}}$=0.14 m/s and the radius of curvature of the central wheel teeth profile is $\rho_{k_0}$=6.43 mm of the satellite teeth profile r=6.27 mm and their difference ($\rho_{k_0}$-r)=0.16 mm (FIG. 14B).

As the angular coordinate increases from one mating pair to the other with the pitch $\psi=360iZ_2/Z_1$[°], for example, from the angular coordinate $\psi_{k_0}$=0° up to $\psi_{k_1}$=15.6° assigned to contact $k_1$, the linear velocities $V_{E_1}$ and $V_{E_2}$ decrease, registering in contact $k_1$ the difference $V_{al_{k_1}}=V_{E_1k_1}-V_{E_2k_1}$=0.34 m/s and the difference of the radii of curvature of the mating flanks in ($\rho_{k_1}$-r)=1.17 mm in contacts $k_2$ corresponding to $\psi_{k_2}$=31.2°, $V_{al_{k_2}}$=0.67 m/s and the difference of the radii of curvature ($\rho_{k_2}$-r)=9.55 mm; in the contact $k_3$ corresponding to $\psi_{k_3}$=46.8° and the teeth contact geometry passes from convex-concave to convex-convex, with the radius of external curvature of the central wheel teeth profile $\rho_{k_3}$=63.93 mm. FIG. 14C shows the evolution of the geometry from contact $k_0$ to contact $k_4$.

Table 1 presents the argumentation and justification of the limits of variation of the frontal overlap degree values $\varepsilon_f$ of the pairs of teeth that are concomitantly in the gear field, of the conical axoid angle δ, of the nutation angle θ between the axes of the crank and central conical wheels, as well as of the circular arc radius r of the flank profile of Z teeth of the satellite wheel gear ring in the section with diameter D, which generally provides for the mating of teeth in convex-concave contact and the reduction in the difference of curvatures of the mating flanks and the relative sliding velocity in the teeth contacts.

Argumentation of the Limits of Variation of the Precessional Gear Parameters According to the Invention

TABLE 1

| Parameter | Lower limit | Upper limit | Note |
|---|---|---|---|
| Degree of frontal overlap $\varepsilon_f$ of teeth that are concomitantly in the gear field. | $\varepsilon_f$ = 1.5 pairs of teeth. Decreasing the $\varepsilon_f$ < 1,5 leads to sensitization of the influence of teeth deformability (other elements of the gear) and technological errors of execution (of the teeth profile and pitch, etc.) on the kinematic precision of the gear, as well as on following the basic principle of the fundamental law of gearing $\omega_s/\omega_g$ = const. | $\varepsilon_f$ = 4.0 pairs of teeth. Increasing the $\varepsilon_f$ > 4,0 leads to the increase of relative frictional sliding in the teeth contacts and the difference in curvatures of the mating flanks, which favors the increase of energetic losses in gear and the diminution of mechanical efficiency. | |
| Gear conical axoid angle δ. | δ = 0°, degrees. If $Z_{1(4)} = Z_{2(3)} - 1$, decreasing the bevel axoid angle by δ < 0° leads to an increase in the radius of curvature of the central wheel teeth in the contact points and, respectively, to an increase in the difference of flank curvatures in the contact points, because r = const, and the load-bearing capacity and mechanical efficiency are decreased by θ = 1.5°, degrees. | δ = 30°, degrees. If $Z_{1(4)} = Z_{2(3)} - 1$, increasing bevel axoid angle by δ > 30° leads to the interference of central wheel teeth profiles and trajectories of the origin of the radius of curvature of the teeth circular arc profiles of the satellite wheel gear rings. | |
| Nutation angle θ between the axes of the crank and central bevel wheels. | Decreasing the nutation angle θ < 1,5° leads to an increase in the pressure angle between the mating flanks, favoring the increase of load in the bearings of the satellite wheel, drive and driven shafts, including energy losses in gears. | θ = 1.5°, degrees. Increasing the nutation angle leads to an increase in the radius of curvature of the flank profile of the central wheel teeth in the contact points of the first four pairs of teeth in the gear field and to an increase in the dynamic of the load in gear. | |
| The circular arc radius r of the flank profile of Z teeth of the satellite wheel gear ring in the section with diameter D. | r = 1.0 D/Z, mm Decreasing the radius of curvature r = 1.0 D/Z leads to the transformation of the teeth flanks of the four pairs of teeth in the gear field with contact with convex-concave geometry in contact with convex-rectilinear or convex-convex geometry. | Exceeding the value of the radius r > 1.57 leads to the non-compliance with the ratio of the teeth pitch lengths of the satellite wheel and central wheel rings, proceeding from the condition of the ratio of the number of teeth $Z_{1(4)} = Z_{2(3)} - 1$. | |

Variation of the frontal overlap within the limits 1.5≤$\varepsilon_f$≤4.0 pairs of teeth that are concomitantly in the gear field, of the bevel axoid angle within the limits 0°≤δ≤30° and of the nutation angle within the limits 1.5°≤θ≤7°, as well as of the circular arc radius r of the tooth flank profiles of the satellite wheel gear rings within the limits 1.0 D/Z [mm] ≤r≤1.57 D/Z [mm], provides for the existence of convex-concave geometry in the contacts of the pairs of teeth located in the gear area with the decrease in the difference of curvatures ($\rho_{kt}$-r) of the flank profiles in the section with diameter D within the limits 0.02D/Z [mm]≤($\rho_{kt}$-r)≤1.5D/Z

[mm] and of the pressure angle α between the flanks by up to 15°, as well as the decrease of the relative sliding velocity between the mating flanks.

These technical solutions favor the increase of the load-bearing capacity and mechanical efficiency of the transmission.

Another difference of the transmission, wherein the wheel teeth are made inclined, which provides an increase in the total length of the contact lines with their gradual entry into the gear field and an increase in the share of pure rolling of the engaged teeth flanks with sphero-spatial interaction is that the teeth of the fixed 6 and mobile 7 central wheels, as well as of the gear rings 3 and 4 of the satellite wheel 2, are inclined. This provides for the increase of the pure rolling share of the engaged teeth flanks with sphero-spatial interaction dependent on the nutation 9 and inclination β angles, and the increase of the total length of the contact lines, with their gradual entry into the gear field.

The total teeth contact line $l_\Sigma$ in the gear with inclined teeth is determined from the condition of frontal gear $\varepsilon_f$ of a certain number of pairs of teeth ($\varepsilon_f$=1, 2, 3 . . . ), but not less than one pair ($\varepsilon_{f,min}$=1). In the case of $\varepsilon_{f,min}$=1, it turns out that a pair of teeth engages, while the previous pair disengages.

According to the condition of providing continuity of gear and the slow course of the transmission, it is necessary that the tooth overlap degree be $\varepsilon_m$>1. Thus, in the case of $\varepsilon_{f,min}$=1, it is proposed to incline the teeth at the angle $\beta_g$, which would ensure a degree of longitudinal (axial) overlap.

$$\varepsilon_f^\beta = \frac{b_w Z_1 \sin\beta_g}{2\pi Z_2}. \tag{18}$$

Figure 15:
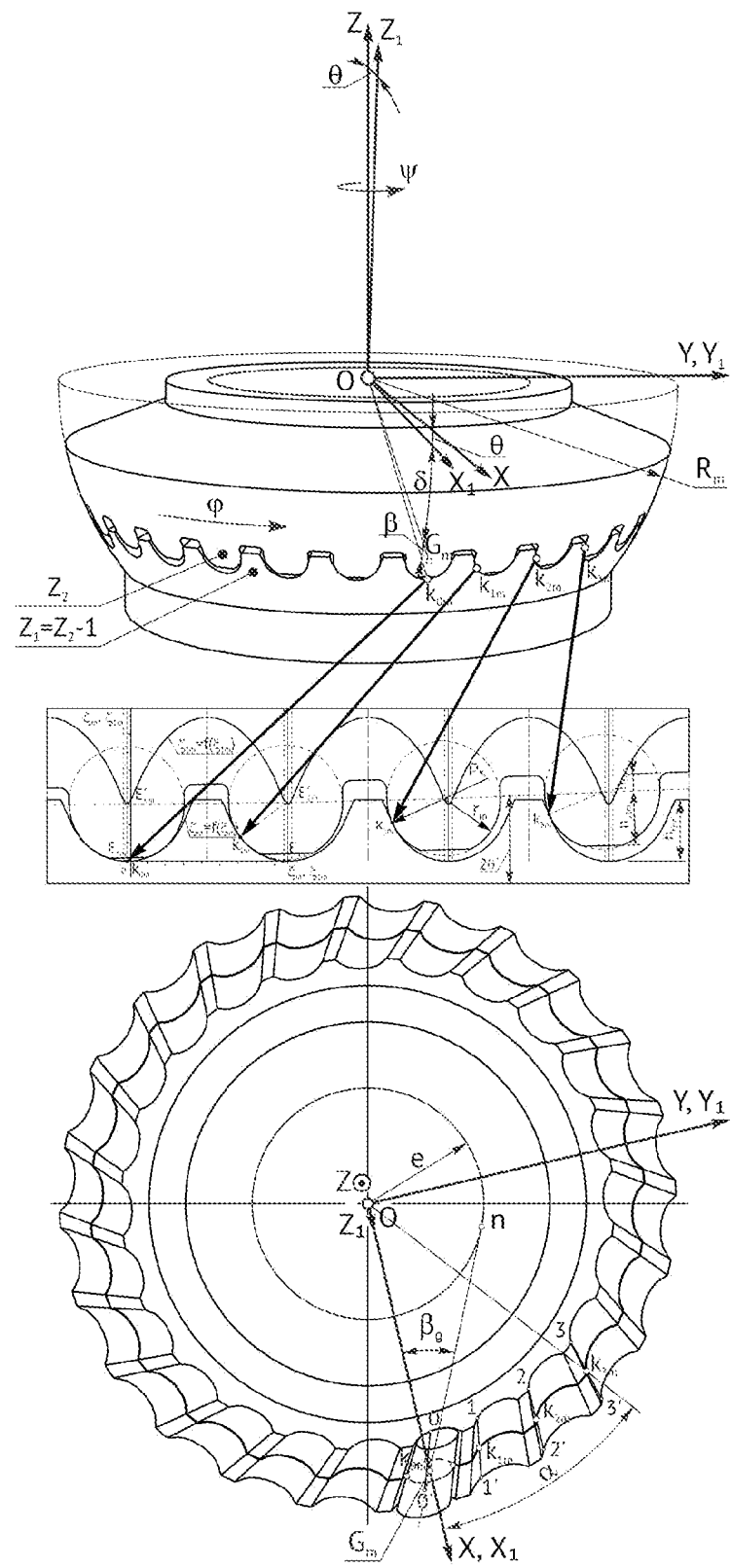
FIG. 15 shows the evolution of the total contact line variation of the inclined teeth depending on $\psi$.

FIG. 15 shows the length, variation and positioning of the contact lines of the inclined engaged teeth within the overlap area, which extends to the center angle α.

From the analysis of the succession of the entry and exit of the tooth pairs from the gear area, we state that the degree of overlap of the engaging teeth and, respectively, the total length of the contact lines of the engaged teeth depend on the frontal overlap $\varepsilon_f^\beta$, determined by the frontal gear multiplicity $\varepsilon_f$ and the longitudinal overlap $\varepsilon_\alpha$ dependent on the teeth inclination angle $\beta_g$, including the configuration parameters Z, δ, θ and the ratio ± of the mating teeth, and on the modification of the teeth height. It is also observed that the contact lines between the inclined teeth are positioned in space so that their extensions are tangent to the cylinder with radius e.

It should be mentioned that the inclination of teeth leads to a diminution of the frictional sliding in the engaged teeth contact, because the teeth mating for the same parameters of the configuration Z, δ, β, θ and $Z_1=Z_2\mp1$ takes place with an increased share of pure rolling of teeth depending on the angle θ.

Unlike straight teeth, the inclined ones do not engage concomitantly along the entire length, but gradually with a certain angle offset ψ depending on the inclination angle β and the tooth length $b_w$.

Figure 16A:
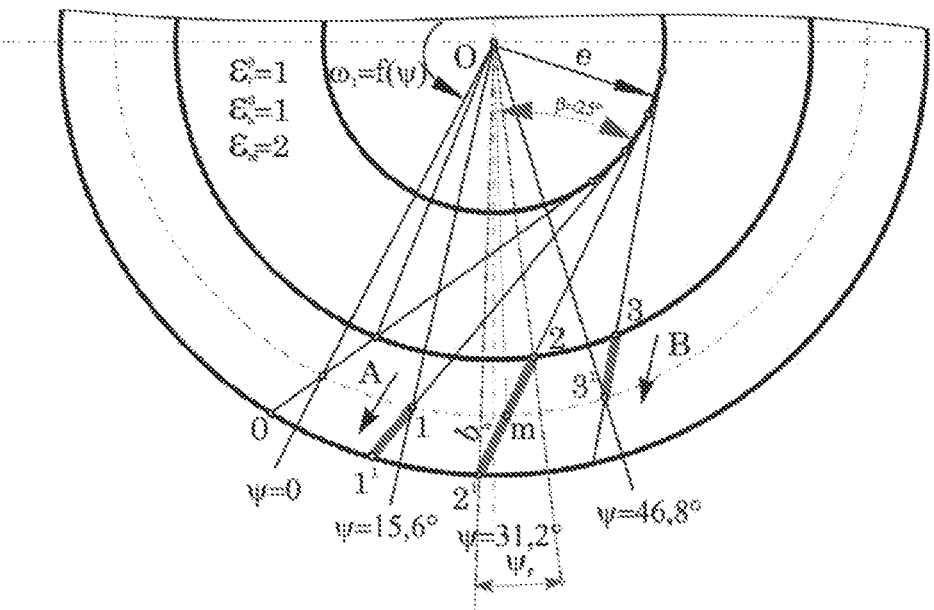
FIGS. 16A and 16B show the contact of the inclined teeth with the angle $\beta_g$ placed in the gear field with a pair of frontal mating teeth (a) and with two pairs (b)
Figure 16B:
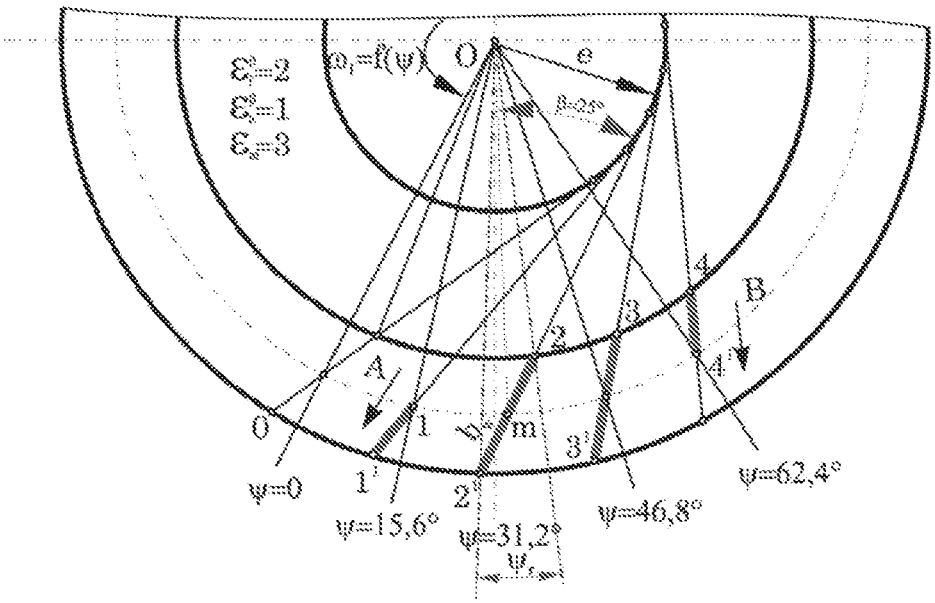

The position of contact lines in the gear with concave-concave contact of the teeth inclined within the limits of the gear field is shown in FIGS. 16A-16B. Upon rotation of the crankshaft $\omega_1$, the contact lines of the engaged teeth move in the gear field in the direction indicated by arrows A and B.

In FIG. 16A with a pair of teeth in frontal gear $\varepsilon_f$=1, in the gear field are covered three pairs of inclined teeth, where pair 2 contacts along the entire length 2-2' of the teeth, pair 1—along the length 1-1', and pair 3—3-3'.

When the crankshaft positioning angle Δψ is increased (FIG. 16A), the length of the contact line 3-3' increases by Δl by moving point 3'to point 3", and the length of the contact line 1-1' decreases by the same length Δl by moving point 1 to 1'. The evolution of the total length of the contact lines 1-1', 2-2' and 3-3' for any value ψ remains constant, $l_\Sigma$=const.

In the case of gearing with two pairs of teeth in frontal gear $\varepsilon_f$=2 shown in FIG. 16B, the teeth pairs with contact 2 and 3 along the entire teeth length are present in the gear field. When the crankshaft rotates with the angular value Δψ, the length of the contact line 4-4' increases by Δl by moving point 4'to 4", and the length of the contact line 1-1' decreases by the same length Δl by moving point 1 to 1'. The total length of the contact lines for any angle value ψ is constant, $l_\Sigma$=const.

In the precessional gear, the inclined teeth are loaded gradually, as they enter the gear field, and in permanent gear there are at least two pairs of teeth:

$$\varepsilon_m = \varepsilon_f^\beta + \varepsilon_\alpha^\beta. \tag{19}$$

The precessional gear with inclined teeth can also work without frontal overlap, thus with $\varepsilon_f^\beta$>1, if the axial overlap $\varepsilon_\beta$ is ensured, i.e. $b_w$>(2π$Z_2$)/($Z_1$tgβ). In the precessional gear with inclined teeth, the load between simultaneously engaged teeth is distributed proportionally to the contact line lengths of the required teeth pairs with load.

Obviously, the specific teeth load q decreases with the increase of the total length of the contact lines $l_\Sigma=\varepsilon_m b_w$ sin δ/cos β, and $l_\Sigma$ does not change over time, because decreasing the length of the teeth contact line 1-1' in any position ψ of the crankshaft is compensated by an equal increase in the length of the contact line 3-3' (FIGS. 16A-16B). Obviously, in case of compliance with $l_\Sigma$=const, the teeth load will not change over time, and the noise emission and dynamic loads will decrease.

At the same time, we can state that in gear the convex-concave contact of the mating teeth in the frontal gear (FIGS. 14A-14C) is formed of flank profiles with the small difference in the radii of curvature (FIG. 14B), and for the same tooth width, the length of the contact lines increases, which leads to the decrease of the specific teeth load.

The maximum effect produced by the inclined teeth of the gear consists in the essential decrease of the relative sliding velocity $V_{al}$ between the flanks (FIG. 15), due to its replacement with the pure rolling of teeth in shares provided by the angle $\psi_r$ (FIG. 16A-16B) dependent on the teeth inclination angle β, teeth length $b_w$, and nutation angle θ of the sphero-spatial motion of the satellite wheel.

The optimal choice (see FIGS. 14A-14C) of the mating reference pair of teeth in the point with the crankshaft positioning angle $\psi_i$ is based on three considerations, namely: the difference in the radii of curvature of the flank profiles in contact ($\rho_k$−r)=min, the sliding velocity between the flanks in contact $V_{al}$=min, the pressure angle $\alpha_w$ of the teeth flank profile of the central wheels $\alpha_w$=min. All these geometry and kinematics parameters of the teeth contact are according to the precession angle ψ.

From the analysis of FIGS. 14A-14C, we observe that the conditions ($\rho_k$−r)=min and $V_{al}$=min can be achieved by reducing the angle ψ, and $\alpha_w$=min by increasing the angle ψ. These three conditions define geometrically and kinematically the contact parameters of the gear flanks, which would provide high efficiency and load-bearing capacity and minimum static demand for the crankshaft and satellite wheel supports.

The third difference of the transmission (FIGS. 17A-17B) is that one of the bevel gear rings 3 or 4 of the satellite wheel 2 has the conical axoid angle $\delta=0°$ and is made of bolts with one less or more than the number of teeth of the central bevel wheel with which it engages, which provides for the pressure angle between the mating flanks $\alpha\leq45°$ and the extension of kinematic possibilities.

Figure 17A:
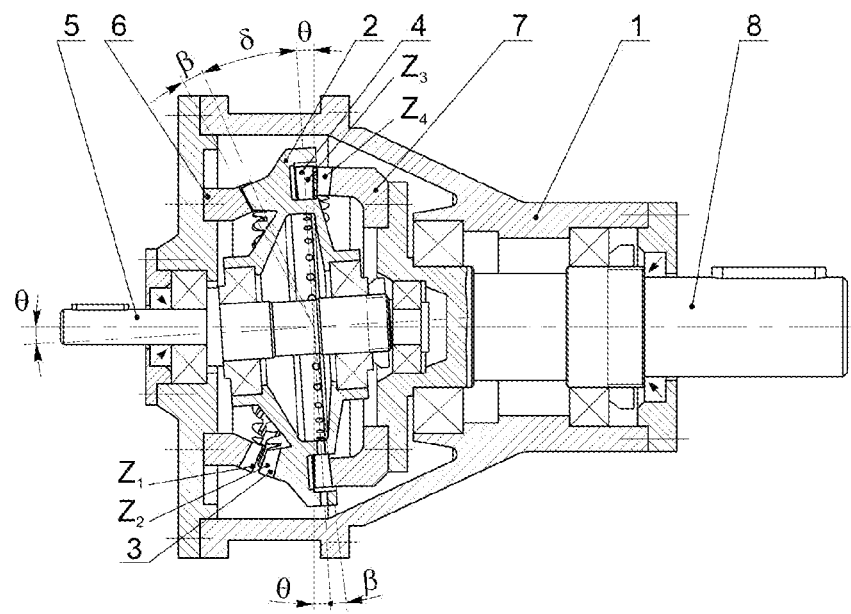
FIGS. 17A and 17B show the precessional transmission with the gear $(Z_3-Z_4)$ of bolts ($\delta=0°$) with the pressure angle between the flanks $\alpha \le 45°$ for the ratio of the numbers of mating teeth $Z_4=Z_3-1$.
Figure 17B:
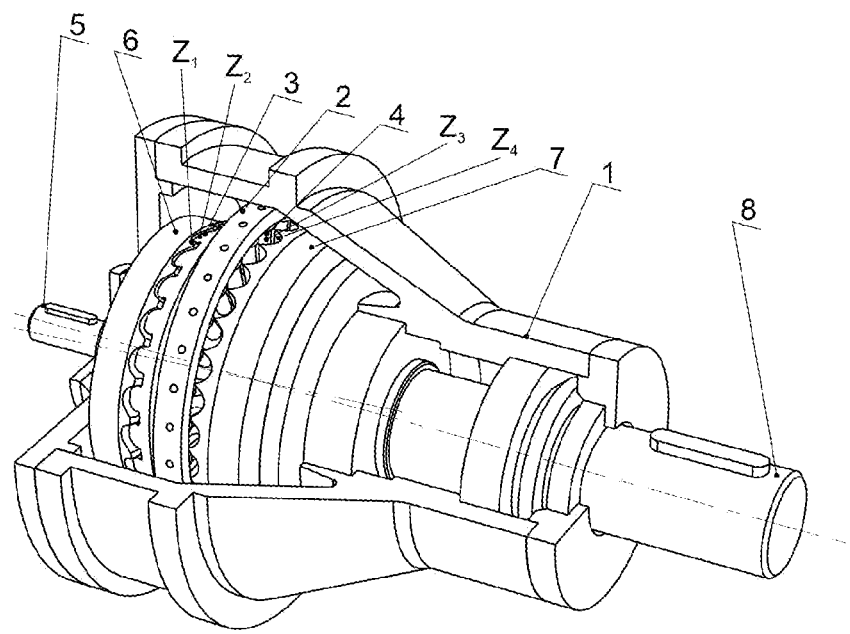

According to an embodiment, one of the satellite wheel bevel gear rings with the conical axoid angle $\delta=0°$ is made of bolts with one less or more than the number of central bevel wheel teeth with which it engages, which provides the pressure angle between the mating flanks $\alpha\leq45°$ and the extension of kinematic possibilities. In FIGS. 17A-17B, the gear ($Z_3$-$Z_4$) is made flat with the conical axoid angle $\delta=0°$ from the toothed crown 4 executed in the form of bolts with one less or more than the number of teeth of the central wheel 7 with which it engages $Z_4=Z_3\pm1$.

Thus, the difference of the transmissions (FIGS. 17A-17B) is in the constructive specific character of the satellite wheel 2 in which the gear ($Z_1$-$Z_2$) is geometrically analogous to the gear ($Z_1$-$Z_2$) of the transmission in FIG. 2B, and the gear ($Z_3$-$Z_4$) is made of toothed crown 4 made in the form of bolts placed in a plane ring with $\delta=0$. Theoretically and by computer simulations based on mathematical models, it was found that in the plane gears with $\delta=0$ the ratio of the numbers of teeth $Z_4=Z_3+1$ or $Z_4=Z_3-1$ do not influence the shape of the central wheel teeth profile 7 and respectively the teeth contact geometry. In the case of $Z_4=Z_3+1$ it is noticed the greater presence of the relative frictional sliding in contact, which is excluded from the teeth contact area by using the toothed crown 4 executed in the form of bolts.

According to an aspect, one of the satellite wheel gear rings with the conical axoid angle $\delta>0°$ is made of conical bolts with one less than the number of central bevel wheel teeth and with a profile angle $\alpha>45°$, which provides the transformation of motion and the transmission of load by rolling the conical bolts on the flank profile of the central wheel teeth with inclined slope effect and, respectively, the operation of the transmission in multiplier mode.

A fourth difference is that at least one of the bevel gear rings 3 or 4 of the satellite wheel 2 is made of bolts with one less than the number of teeth of the engaged bevel central wheel and has the conical axoid angle $\delta>0°$ (FIGS. 18A-18B), which provides for the pressure angle between the mating flanks $\alpha>45°$ and the operation of the transmission in multiplier mode.

Figure 18A:
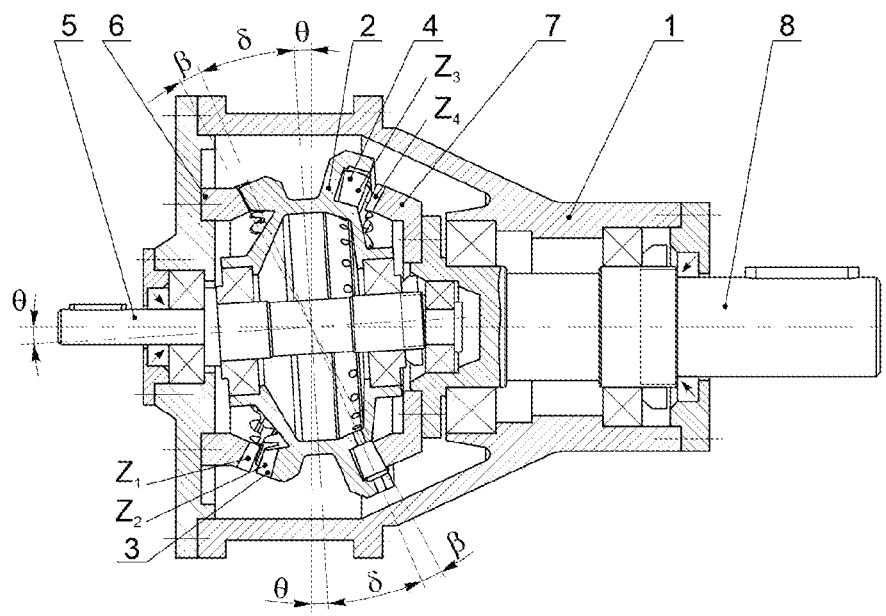
FIGS. 18A and 18B show the precessional transmission with the gear $(Z_3-Z_4)$ of bolts ($\delta>0°$) with the pressure angle between the flanks for the ratio of the numbers of mating teeth $Z_4=Z_3+1$ (for multiplier operation mode)
Figure 18B:
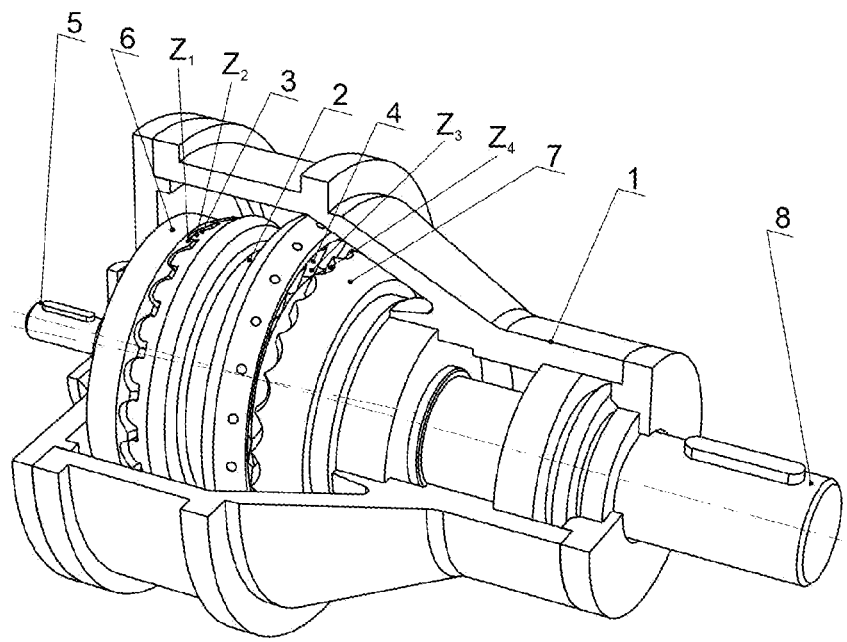
Figure 19A:
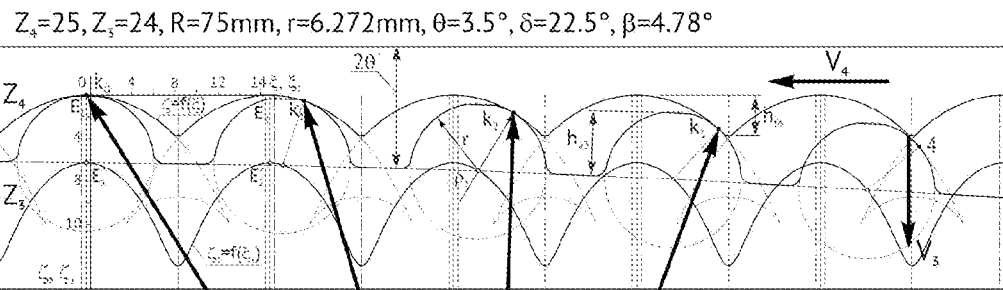
FIGS. 19A and 19B illustrate the bolt-tooth interaction in the gear $Z_4=Z_3+1$ with multiplier operation mode.
Figure 19B:
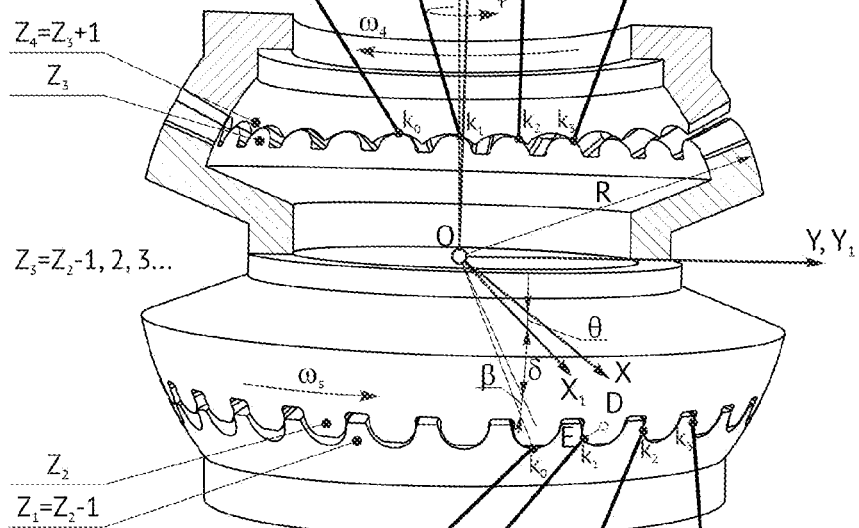
Figure 19B:
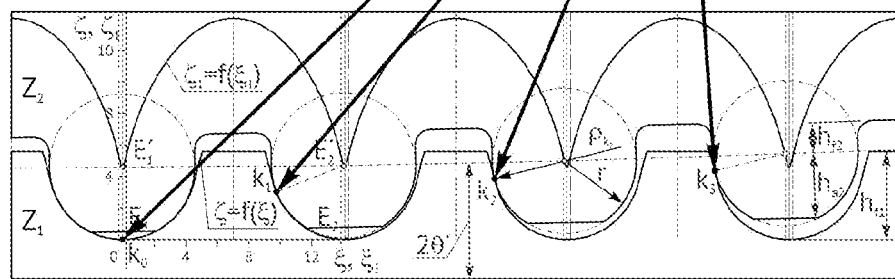

It is worth mentioning that, according to FIGS. 18A-18B, the gear ($Z_3$-$Z_4$) is also made of bolts, but with the conical axoid angle $\delta>0°$ and with a bolt less than the number of teeth of the central wheel with which it mates.

This configuration with $\delta>0°$ and $Z_4=Z_3+1$ provides for the increase of the pressure angle $\alpha$ between the flanks of the central wheel teeth 7 and the toothed crown 4 made in the form of bolts of the satellite wheel 2, which favors, from the point of view of energy losses, the transformation of the rotational motion of the driving shaft 5 (which replaces the function of the crankshaft) in sphero-spatial motion of the satellite wheel 2 by using the inclined slope effect.

Thus, the solution according to FIGS. 18A-18B with $\delta>0°$ and $Z_4=Z_3+1$ provides for the operation of the transmission in multiplier operation mode by multiplying the revolutions from shaft 8 to shaft 5.

According to an aspect, the satellite wheel is installed on a spherical support placed on the driven shaft in its center of precession and coaxially with the mobile central bevel wheel. At the same time the satellite wheel is equipped with a semi-axle, at the end of which is mounted a bearing, kinematically coupled with the crankshaft. A fifth difference of the claimed transmission is that the satellite wheel 2 (FIG. 20A) is installed on a spherical support 9 placed on the driven shaft 8 in its precession center and coaxially with the mobile central bevel wheel 7, at the same time the satellite wheel 2 is equipped with a semi-axle 10, at the end of which is mounted a bearing 11, kinematically connected to the crank 5 installed on the driving shaft of an electric motor.

Figure 20A:
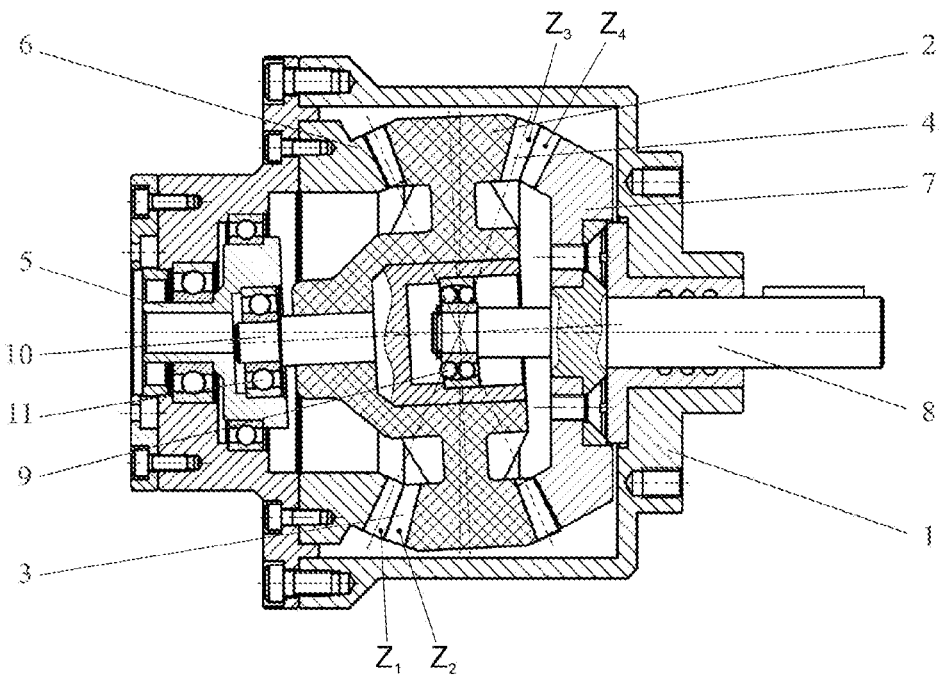
FIGS. 20A-20C show the precessional toothed gear transmission with convex-concave contact and difference in the numbers of mating teeth $Z_{1(4)}=Z_{1(3)}-1$.
Figure 20B:
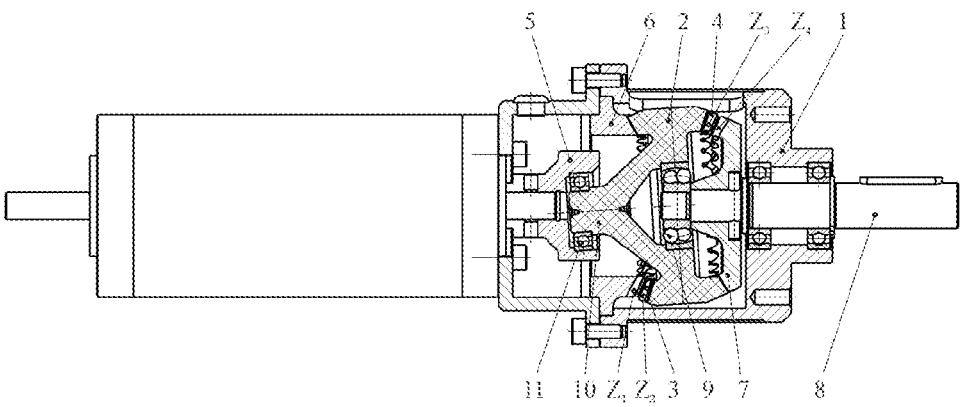
Figure 20C:
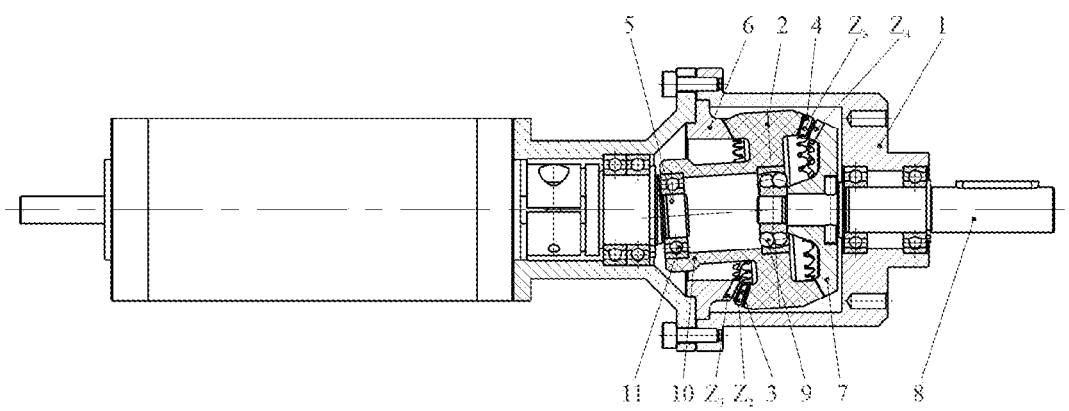

The precessional gear reducer shown in FIG. 20A and a motor-reducer shown in FIG. 20B operate in the following mode.

The rotational motion of the crankshaft 5 (or the electric motor) is transformed in sphero-spatial motion of the satellite wheel 2 by means of the bearing 11, mounted on the end of the semi-axle 10 of the satellite wheel 2, which, in turn, is mounted in the seat of the crankshaft 5. The satellite wheel 2 involved in the sphero-spatial motion with the frequency of precession cycles respectively with the teeth of the immobile 6 and mobile 7 central wheels. As a result, the driven shaft will rotate with reduced rotational frequency with the transmission ratio $$i^b_{HV} = -\frac{Z_2 Z_4}{Z_1 Z_3 - Z_2 Z_4} \tag{20}$$

INDUSTRIAL APPLICABILITY

Thus, the technical solutions as disclosed above and in the figures provide for the increase of the load-bearing capacity and mechanical efficiency, as well as the extension of the kinematic and functional possibilities.

The load-bearing capacity of the mechanical transmission gears depends on the degree of overlap and the contact geometry of the engaging teeth.

Based on these considerations, the analysis of the load-bearing capacity of the precessional gear transmission according to the invention, in comparison with the most efficient existing transmissions, for example Wildhaber-Novicov (W-N) shows the following:

1. In case of compliance with the similarity of the "convex-concave" contact geometry with equal diameters of the gears, the difference in the radii of curvature in the gear (W-N) is estimated by $(R_1-R_2)=(1.55-1.4)$ mm, $m_n=0.75$ mm, and in the precessional gear, the difference in the curvatures of the flanks in the first three pairs of teeth $(\rho_{k_1}-r)$ respectively is 0.16 mm, 1.17 mm, 9.55 mm (see FIGS. 14A-14C).

It is also worth mentioning that in the gear (W-N), the frontal overlap of the teeth is $\varepsilon_f=(0.85-0.95)$ pairs of teeth, and in the precessional gear transmission according to aspects of the present invention, the frontal overlap of the teeth is $\varepsilon_f=(1.5-4.0)$ pairs of teeth concomitantly in the gear field.

2. The mechanical efficiency of a gear with gear wheels depends on the relative frictional sliding velocity between the mating flanks. From the analysis of the graphs presented in FIGS. 14A-14C, it is obvious that the relative sliding velocity in the first three mating pairs of teeth in the precessional gear is lower than in the classical evolvent gears including in the gear (W-N).

3. Concerning the kinematic possibilities, the precessional gear transmission at the present time has no analogues among the worldwide known transmissions.

BIBLIOGRAPHICAL REFERENCES

1. SU 1455094 A1 1989.01.30
2. SU 1758322 A1 1992.08.30

What is claimed is:

1. A precessional gear transmission including a casing, a satellite wheel with two bevel gear crowns installed on an inclined portion of a crankshaft between two central bevel gear wheels, a first central bevel gear wheel being immovably fixed in the casing and a second central bevel gear wheel being mounted on a driven shaft, gearing engagement of teeth being performed by contacts with convex-concave geometry, wherein teeth flanks of the two central bevel gear wheels have variable continuously increasing curvature from a base to a tip of the teeth and teeth of the crowns of satellite wheel have a circular arc flank profile, determined according to the configuration of parameters $\theta$, $\delta$, $\beta$ and Z, at the same time the teeth of the two central bevel gear wheels and the teeth of the crowns of satellite wheel are shortened in height, wherein the teeth of the central wheels and the crowns of satellite wheel engage in multipair contacts with convex-concave geometry with a small difference of the profile flanks curvature of the teeth, including with pressure angles of up to 15° between conjugated flanks, gearings having a correlation of numbers of teeth of mating wheels $Z_1=Z_2-1$, $Z_4=Z_3-1$ or $Z_1=Z_2+1$, $Z_4=Z_3-1$ or $Z_1=Z_2-1$, $Z_4=Z_3+1$ respectively, with an angle $\delta$ of a conical axoid $0°<\delta\leq30°$ or with $\delta=0°$, and an angle $\beta$ that encompasses a radius of curvature r of the teeth profile of the crowns of satellite wheel being within limits of $2°\leq\beta\leq7°$, and a nutation angle $\theta$ between axes of the crankshaft and the central bevel gear wheels having limits $1.5°\leq\theta\leq7°$.

2. The precessional gear transmission of claim 1, wherein one of the two bevel crown gears of the satellite wheel comprises conical bolts placed on a conical surface with axoid angle $\delta=0°$ or with $\delta>0°$, in which one of the central bevel gear wheels has a correlation of numbers of the conjugated teeth $Z_1=Z_2+1$ or $Z_4=Z_3+1$ and engages with the one wheel bevel gear crown with the bolts in multipair contacts, in a gearing made with the angle of the conical axoid $\delta=0°$, the one central gear bevel wheel has teeth with the profile angle $\alpha_w\leq45°$, and in a gearing made with $\delta>0°$, the profile angle is $\alpha_w>45°$, which provides a transformation of motion by rolling the bolts on the flanks of the teeth of the one central gear bevel wheel with an inclined wedge effect in multiplier mode.

3. The precessional gear transmission of claim 1, wherein the satellite wheel is equipped with a semiaxle, at the end of which is mounted a bearing kinematically coupled with the crankshaft.

4. The precessional gear transmission of claim 1, wherein wheel teeth are made inclined, which provides an increase in total length of contact lines with their gradual entry into a gear field and an increase in a share of pure rolling of engaged teeth flanks with sphero-spatial interaction.

5. The precessional gear transmission of claim 1, wherein one of the bevel gear crowns of the satellite wheel with a conical axoid angle $\delta=0°$ comprises bolts with one less or more than a number of central bevel wheel teeth with which it engages, which provides a pressure angle between mating flanks $\alpha_w\leq45°$ and extension of kinematic possibilities.

6. The precessional gear transmission of claim 1, wherein one of the bevel gear crowns of the satellite wheel with a conical axoid angle $\delta>0°$ comprises conical bolts with one less than a number of central bevel wheel teeth and with a profile angle $\alpha_w>45°$, which provides transformation of motion and transmission of load by rolling the conical bolts on a flank profile of the central bevel wheel teeth with inclined slope effect and, respectively, operation of the transmission in multiplier mode.

7. The precessional gear transmission of claim 1, wherein the satellite wheel is installed on a spherical support placed on the driven shaft in its center of precession and coaxially with a mobile central bevel gear wheel, at the same time the satellite wheel is equipped with a semi-axle, at the end of which is mounted a bearing, kinematically coupled with the crankshaft.

8. A precessional gear transmission including a casing, a satellite wheel with two bevel gear crowns installed on an inclined portion of a crankshaft between two central bevel gear wheels, a first central bevel gear wheel being immovably fixed in the casing and a second central bevel gear wheel being mounted on a driven shaft, wherein teeth gearing is performed in contacts with convex-concave geometry, wherein the central bevel gear wheels comprise curvilinear flank profiles with variable curvature with one tooth less than the satellite wheel with two bevel gear crowns made with circular arc flank profiles, teeth have flanks which mate with frontal overlap $\varepsilon_f$ simultaneously engaged pairs of teeth, at the same time the gear wheels are made with a conical axoid angle, and a circular arc radius of the flank profiles of a Z-toothed satellite wheel gear crown provides a diminution of a difference in curvatures of the flank profiles in a section with diameter D and a decrease in pressure angle $\alpha_w$ between the flanks of up to 15°, as well as a decrease in relative sliding velocity between mating flanks.

9. The precessional gear transmission according to claim 8, wherein mating is with frontal overlap $\varepsilon_f$ within limits of $1.5\leq\varepsilon_f\leq4.0$.

10. The precessional gear transmission according to claim 9, wherein the conical axoid angle is within the limits $0°<\delta\leq30°$ and with $\delta=0°$.

11. The precessional gear transmission according to claim 10, wherein an angle between axes of the crankshaft and the central bevel gear wheels is within the limits $1.5°\leq\theta\leq7°$.

12. The precessional gear transmission according to claim 11, wherein the circular arc radius of the flank profile of the Z-toothed satellite wheel gear crown is within the limits $(1.0-1.57)$ D/Z [mm].

13. The precessional gear transmission according to claim 12, wherein the diminution of the difference in the curvatures of the flank profiles in a section with diameter D is up to $(0.02-1.5)$ D/Z [mm].

* * * * *